United States Patent
Al-Shaikhi

(10) Patent No.: US 12,523,791 B2
(45) Date of Patent: Jan. 13, 2026

(54) RANDOMLY QUANTIZED SEISMIC DATA RECONSTRUCTION USING LSTM NETWORK

(71) Applicant: KING FAHD UNIVERSITY OF PETROLEUM AND MINERALS, Dhahran (SA)

(72) Inventor: Ali Al-Shaikhi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 382 days.

(21) Appl. No.: 18/332,401

(22) Filed: Jun. 9, 2023

(65) Prior Publication Data

US 2024/0411038 A1  Dec. 12, 2024

(51) Int. Cl.
*G01V 1/30* (2006.01)

(52) U.S. Cl.
CPC .......... *G01V 1/308* (2013.01); *G01V 2210/57* (2013.01); *G01V 2210/612* (2013.01)

(58) Field of Classification Search
CPC .............. G01V 1/308; G01V 2210/57; G01V 2210/612
See application file for complete search history.

(56) References Cited

U.S. PATENT DOCUMENTS

| | | | | |
|---|---|---|---|---|
| 5,638,338 A * | 6/1997 | Peterson | ................. | G01V 1/368 367/73 |
| 2016/0291179 A1 * | 10/2016 | Keskes | .................. | G01V 1/301 |
| 2022/0075915 A1 | 3/2022 | Vallabhaneni et al. | | |
| 2022/0120928 A1 | 4/2022 | Hori et al. | | |
| 2022/0196867 A1 * | 6/2022 | Bekara | .................. | G01V 1/303 |

FOREIGN PATENT DOCUMENTS

CN  115061192 A  9/2022

OTHER PUBLICATIONS

Deborah Pereg, et al., "Sparse seismic deconvolution via recurrent neural network", Journal of Applied Geophysics, vol. 175, 2020, pp. 1-10.

(Continued)

*Primary Examiner* — Elias Desta
(74) *Attorney, Agent, or Firm* — Oblon, McClelland, Maier & Neustadt, L.L.P.

(57) ABSTRACT

A system for performing a seismic survey of a geological formation is described. The system includes a seismic transducer, an array of seismic sensors, a transmitter, a receiver, and a computing device. The seismic transducer generates a seismic source wavelet within a geological formation. The array of seismic sensors generates seismic traces. The transmitter transmits the seismic traces. The receiver receives the seismic traces and generates a set of seismic time-series traces. A quantizer compresses the set of seismic time series traces by randomly selecting a subset of samples of the set of seismic time-series traces. A trained long short-term memory (LSTM) neural network based autoencoder deconvolves the randomly selected subset of samples and generates a deconvolved randomly selected subset of samples. The computing device reconstructs the seismic waves reflected from the geological formation from the deconvolved randomly selected subset of samples.

20 Claims, 23 Drawing Sheets

(56) References Cited

OTHER PUBLICATIONS

G. Roncoroni, et al., "Efficient extraction of seismic reflection with Deep Learning", Computers & Geosciences, vol. 166, Sep. 2022, 2 pages (Abstract only).

Naxia Yang, et al., "Reflection Coefficients Inversion Based on the Bidirectional Long Short-Term Memory Network", IEEE Geoscience and Remote Sensing Letters, vol. 19, Oct. 21, 2022, 3 pages (Abstract only).

Ali Al-Shaikhi, "Signal Recovery from Randomly Quantized Data Using Neural Network Approach", Sensors, vol. 22, Issue 22, Nov. 11, 2022, pp. 1-17.

Ewout Van Den Berg, et al., "Probing the Pareto Frontier for Basis Pursuit Solutions", Siam Journal on Scientific Computing, vol. 31, No. 2, 2008, pp. 890-912.

Naveed Iqbal, et al., "Sparse Multichannel Blind Deconvolution of Seismic Data via Spectral Projected-Gradient", IEEE Access, vol. 7, Feb. 13, 2019, pp. 23740-23751.

\* cited by examiner

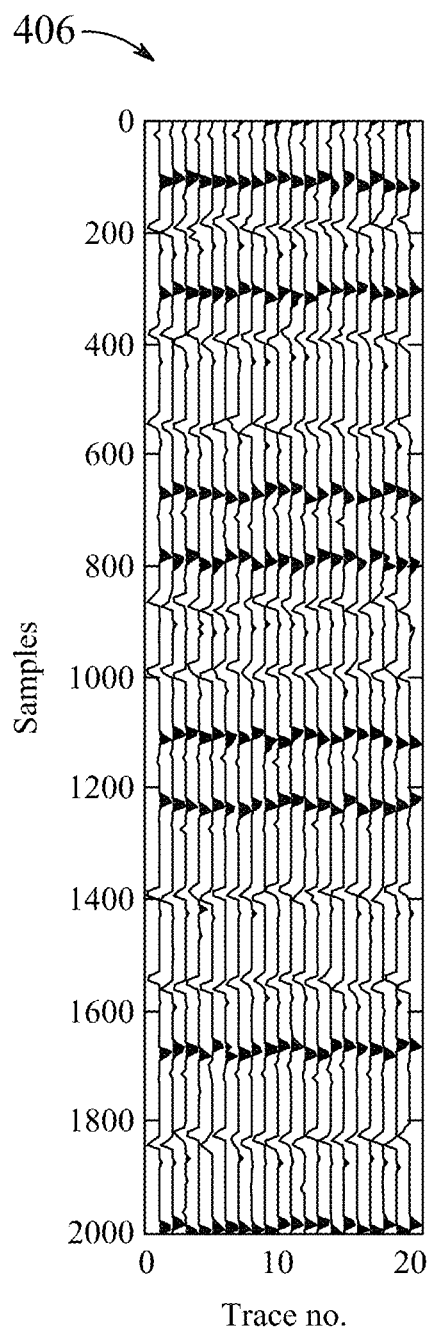
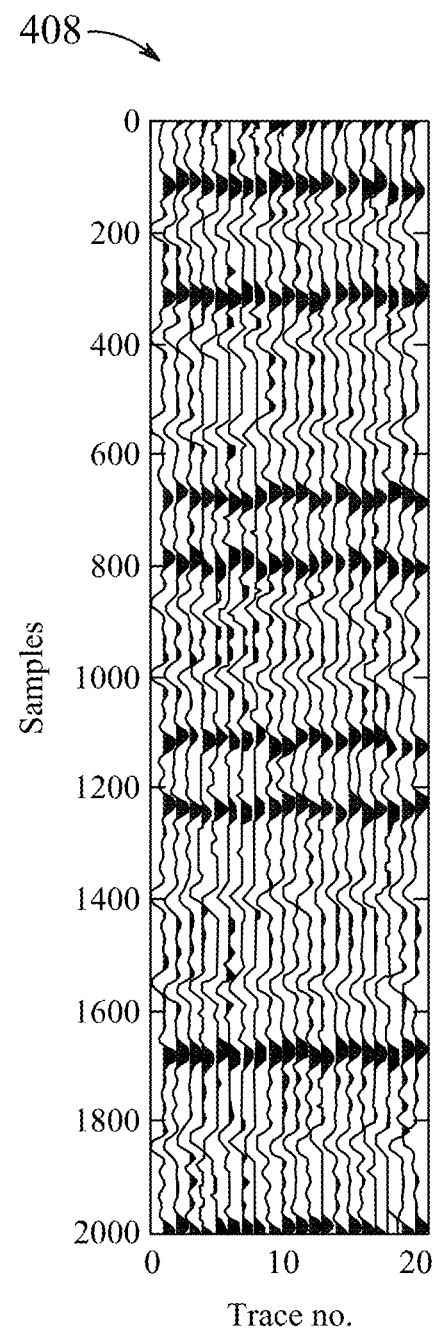
FIG. 4C
FIG. 4D

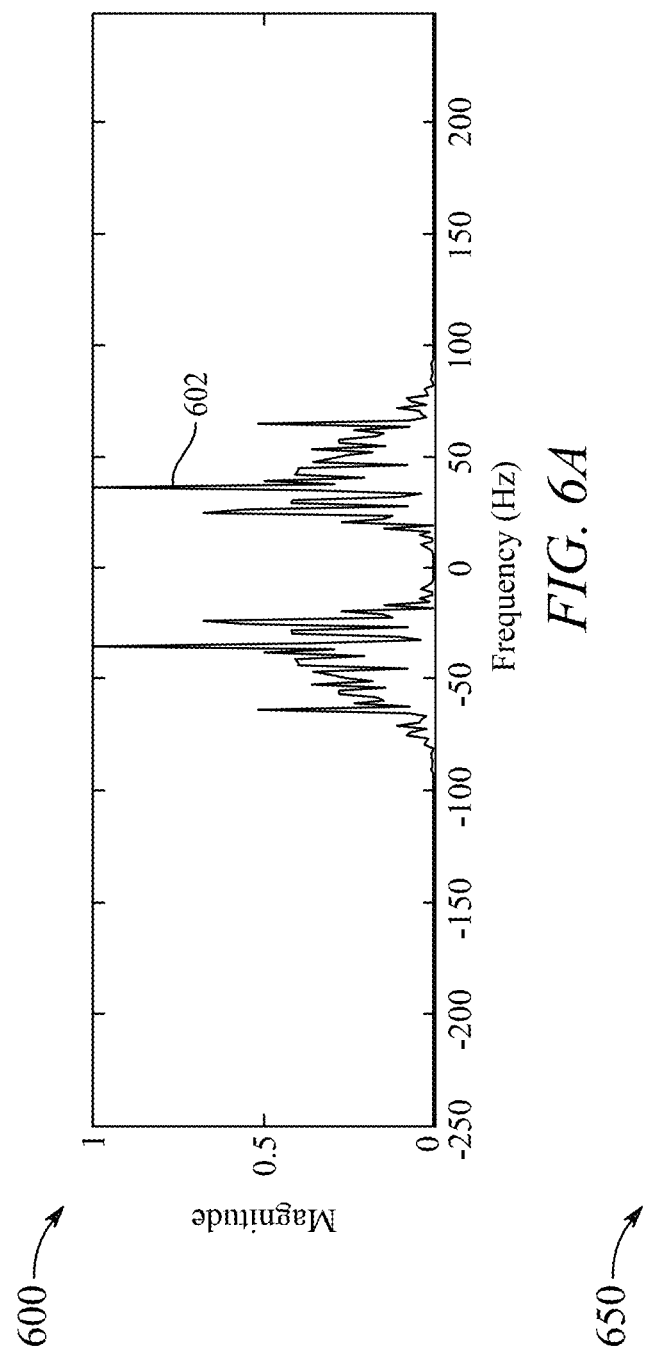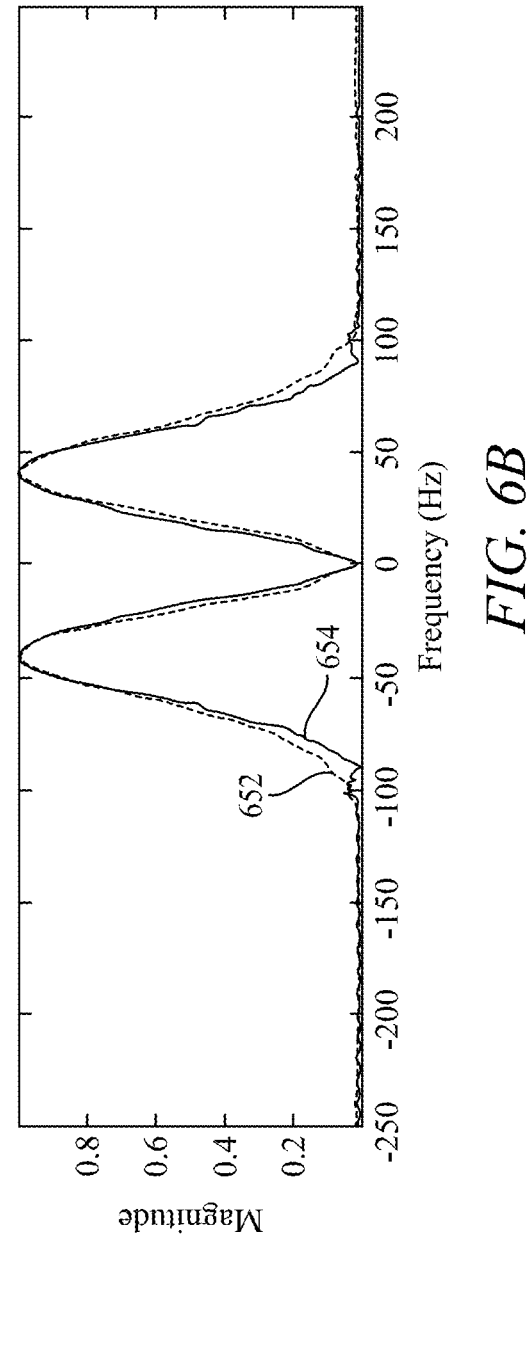
FIG. 6A
FIG. 6B 1202          1204          1206
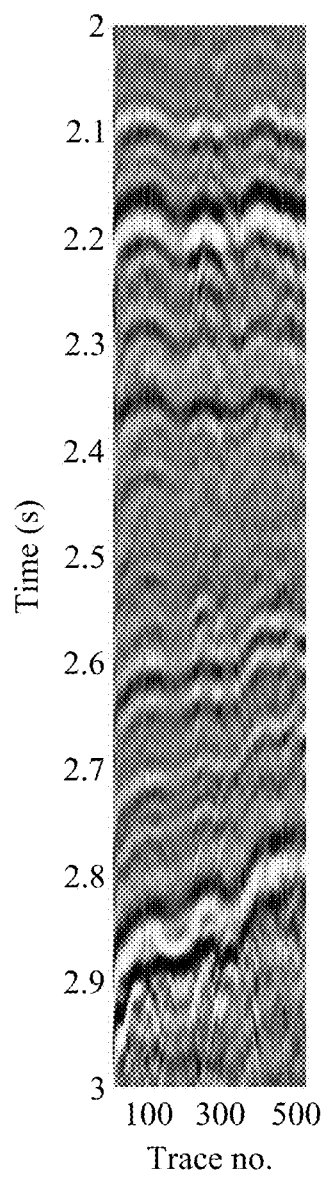 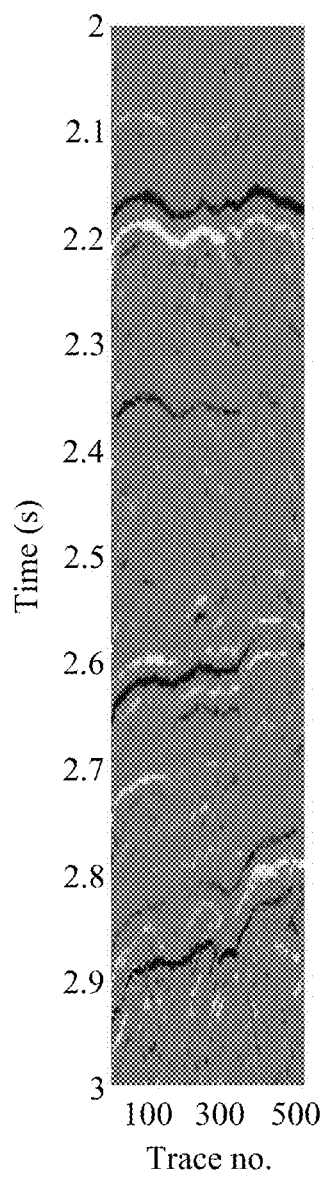 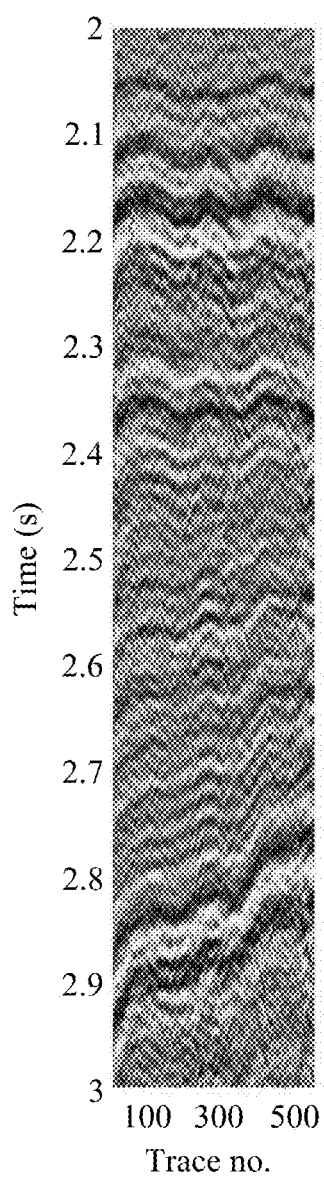
*FIG. 12A*      *FIG. 12B*      *FIG. 12C*

RANDOMLY QUANTIZED SEISMIC DATA RECONSTRUCTION USING LSTM NETWORK

STATEMENT REGARDING PRIOR DISCLOSURE BY THE INVENTORS

Aspects of the invention are described in an article "Signal Recovery from Randomly Quantized Data Using Neural Network Approach" published in Sensors 2022, Vol. 22, Page 8712, on Nov. 11, 2022, which is incorporated herein by reference in its entirety.

BACKGROUND

Technical Field

The present disclosure is directed to a system for performing a seismic survey of a geological formation by performing deconvolution utilizing a long short-term memory (LSTM) autoencoder network.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A seismic survey is an important tool for exploring subsurface mineral deposits, volcanic monitoring, landslide monitoring, and earthquake prediction. The seismic survey is performed by sending seismic waves deep into a subsurface of a geological formation and recording the reflected and refracted waves as seismic data. The acquisition of seismic data requires special devices such as vibration trucks, sensors, and geophones. The acquired seismic data is processed and reconstructed such that by analyzing the reconstructed data, the seismic survey can provide insights into subsurface structure of the geological formation, without requiring any physical operations such as drilling wells into the geological formation. In the seismic data acquisition stage, the acquired seismic data is often irregular, incomplete and noisy due to limited acquisition conditions and interfering obstacles, such as buildings, rivers, cliffs and other surface or subsurface formations.

Noisy and/or missing seismic traces are not uncommon in acquired seismic data and result in a reduction of quality of the seismic data and affects the accuracy of reconstructed seismic data. Therefore, seismic data denoising and interpolation reconstruction is an important part of seismic data preprocessing. Additionally, due to restricted exploration budgets, sparse sampling is lower priced and is therefore preferred in areas generating dense seismic data. However, irregular sampling and sparse sampling both influence the quality of the signal. Sparse sampling may decrease an amplitude of the signal frequency spectrum, and irregular sampling may lead to creation of aliases, which affects data processing and interpretation.

Conventionally, three types of reconstruction procedures are employed: 1) procedures based on mathematical transforms, such as the Fourier transform and the Curvelet transform; 2) procedures based on a convolution operator; and 3) procedures based on a wave equation. Seismic traces are commonly represented as convolutions of the seismic wavelet (source waveform) with multiple reflectivity channels. Seismic deconvolution involves extracting the seismic wavelet from the recorded seismic traces. Seismic deconvolution produces effective interpretable seismic data.

Some conventional methods of reconstruction include full waveform inversion (FWI), steepest descent (SD) algorithms. FWI is a high-resolution imaging tool in seismic exploration. FWI is based on using the entire content of seismic traces for extracting physical parameters of the subsurface. SD is a local optimization algorithm to update a P-wave (primary wave or pressure wave) velocity model in FWI, but the SD method takes a greater number of iterations due to its inefficient search direction. Other conventional solutions include applying a deconvolution filter, such as a deconvolution prediction filter, or employing a fast sparse method for blind multichannel deconvolution. These solutions generate a deconvolution filter based on an established criteria, for example, the $\ell_1/\ell_2$-norm or least squares of the deconvolved signal. The computational cost of such deconvolution filters is far less than the other techniques. However, the limited filter length is a bottleneck in their performance. For instance, a Wiener filter increases a noise in the process of deconvolution and cannot produce a wide band spiky deconvolution result.

Accordingly, it is one object of the present disclosure to provide methods and systems for performing a seismic survey utilizing a long short-term memory (LSTM) autoencoder network to achieve prediction robustness and accuracy.

SUMMARY

In an embodiment, a method for performing a seismic survey of a geological formation is described. The method includes generating, with a seismic transducer located at a surface of the geological formation, a seismic source wavelet within the geological formation. The method includes receiving, by an array of seismic sensors located at a surface of the geological formation, the seismic source wavelet convolved with seismic waves reflected from the geological formation plus noise and generating, by the array of seismic sensors, seismic traces by transducing the seismic source wavelet convolved with the seismic waves reflected from the geological formation plus the noise into electrical signals. The method includes transmitting, by each seismic sensor of the array of seismic sensors, the seismic traces. The method includes receiving, by a receiver, the seismic traces from each seismic sensor of the array of seismic sensors. The method includes generating, by the receiver, a set of seismic time-series traces. The method includes recording, in a memory of a computing device connected to the receiver, the set of seismic time-series traces. The method includes compressing, by the computing device, the set of seismic time series traces by quantizing a randomly selected subset of samples of the set of seismic time-series traces. The method includes deconvolving, by a trained long short-term memory (LSTM) neural network based autoencoder connected to the computing device, the randomly selected subset of samples. The method includes generating, by the trained LSTM neural network based autoencoder, a deconvolved randomly selected subset of samples. The method includes reconstructing, by the computing device, the seismic waves reflected from the geological formation from the deconvolved randomly selected subset of samples.

In another exemplary embodiment, a system for performing a seismic survey of a geological formation is described. The system includes a seismic transducer, an array of seismic sensors, a transmitter, a receiver, a computing device, a quantizer, a trained long short-term memory (LSTM) neural network based autoencoder, and a computer screen. The seismic transducer is located at a surface of the geological formation. The seismic transducer is configured to generate a seismic source wavelet within the geological formation. The array of seismic sensors is located at a surface of the geological formation. The array of seismic sensors is configured to generate seismic traces. The seismic traces include the seismic source wavelet convolved with seismic waves reflected from the geological formation plus noise. The transmitter is operatively connected to each of the seismic sensors of the array of seismic sensors. The transmitter is configured to wirelessly transmit the seismic traces. The receiver is configured to receive the seismic traces and generate a set of seismic time-series traces. The computing device includes electrical circuitry, a memory storing program instructions, and a processor configured to execute the program instructions. The quantizer is operatively connected to the processor. The quantizer is configured to compress the set of seismic time series traces by randomly selecting a subset of samples of the set of seismic time-series traces. The trained long short-term memory (LSTM) neural network based autoencoder is operatively connected to the processor. The trained LSTM neural network based autoencoder is configured to deconvolve the randomly selected subset of samples and generate a deconvolved randomly selected subset of samples. The computer screen is operatively connected to the computing device. The computing device is configured to reconstruct the seismic waves reflected from the geological formation from the deconvolved randomly selected subset of samples and render the reconstructed seismic waves reflected from the geological formation on the computer screen.

In another exemplary embodiment, a method for performing a seismic survey of a volume of a below ground substrate is described. The method includes selecting an array of seismic sensors for performing the seismic survey. The method includes installing the array of seismic sensors on a ground surface above the volume of a below ground substrate in a pattern configured to detect reflected seismic waves from areas of interest within the volume. The method includes generating, with a seismic transducer, a seismic source wavelet within the volume. The method includes receiving, by an array of seismic sensors located at a surface of the geological formation, the seismic source wavelet convolved with seismic waves reflected from the geological formation plus noise and generating, by the array of seismic sensors, seismic traces by transducing the seismic source wavelet convolved with the seismic waves reflected from the geological formation plus the noise into electrical signals. The method includes transmitting, by each one of the array of seismic sensors, the seismic traces. The method includes receiving, by a receiver, the seismic traces from each one of the array of seismic sensors. The method includes generating, by the receiver, a set of seismic time-series traces. The method includes recording, in a memory of a computing device connected to the receiver, the set of seismic time-series traces. The method includes compressing, by the computing device, the set of seismic time series traces by quantizing a randomly selected subset of samples of the set of seismic time-series traces. The method includes deconvolving, by a trained long short-term memory (LSTM) neural network based autoencoder connected to the computing device, the randomly selected subset of samples, wherein deconvolving comprises removing the seismic source wavelet and the noise from each seismic time-series trace of the randomly selected subset of samples. The method includes generating, by the trained LSTM neural network based autoencoder, a deconvolved randomly selected subset of samples. The method includes reconstructing, by the computing device, the reflected seismic traces from the deconvolved randomly selected subset of samples. The method includes comparing, by the computing device, an amplitude of each reflected seismic trace to a threshold value and identifying spikiness when the magnitude exceeds the threshold value. The method includes determining, by the computing device, a pattern of the spikiness. The method includes comparing, by the computing device, the pattern of the spikiness to a database storing records which relate patterns of spikiness to structures in the volume. The method includes displaying, on a computer screen of the computing device, the reflected seismic traces with the identification of the structures in the volume.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4C is an exemplary representation of a deconvolution result with basis pursuit method during the synthetic simulation, according to certain embodiments.

FIG. 4D is an exemplary representation of deconvolution result with steepest decent method during the synthetic simulation, according to certain embodiments.

FIG. 6A is an exemplary frequency-domain view of the wavelet recovery process during a first iteration of the method of the present disclosure, according to certain embodiments.

FIG. 6B is an exemplary frequency-domain view of the wavelet recovery process during a final iteration of the method of the present disclosure, according to certain embodiments.

FIG. 12A is another exemplary representation of a subset of received data having a window of 2 s≤t≤3 s and 500 seismic traces during the field simulation, according to certain embodiments.

FIG. 12B is another exemplary representation of deconvolution result with basis pursuit method during the field simulation, according to certain embodiments.

FIG. 12C is another exemplary representation of deconvolution result with steepest decent method for synthetic simulation during the field simulation, according to certain embodiments.

DETAILED DESCRIPTION

Figure 1:
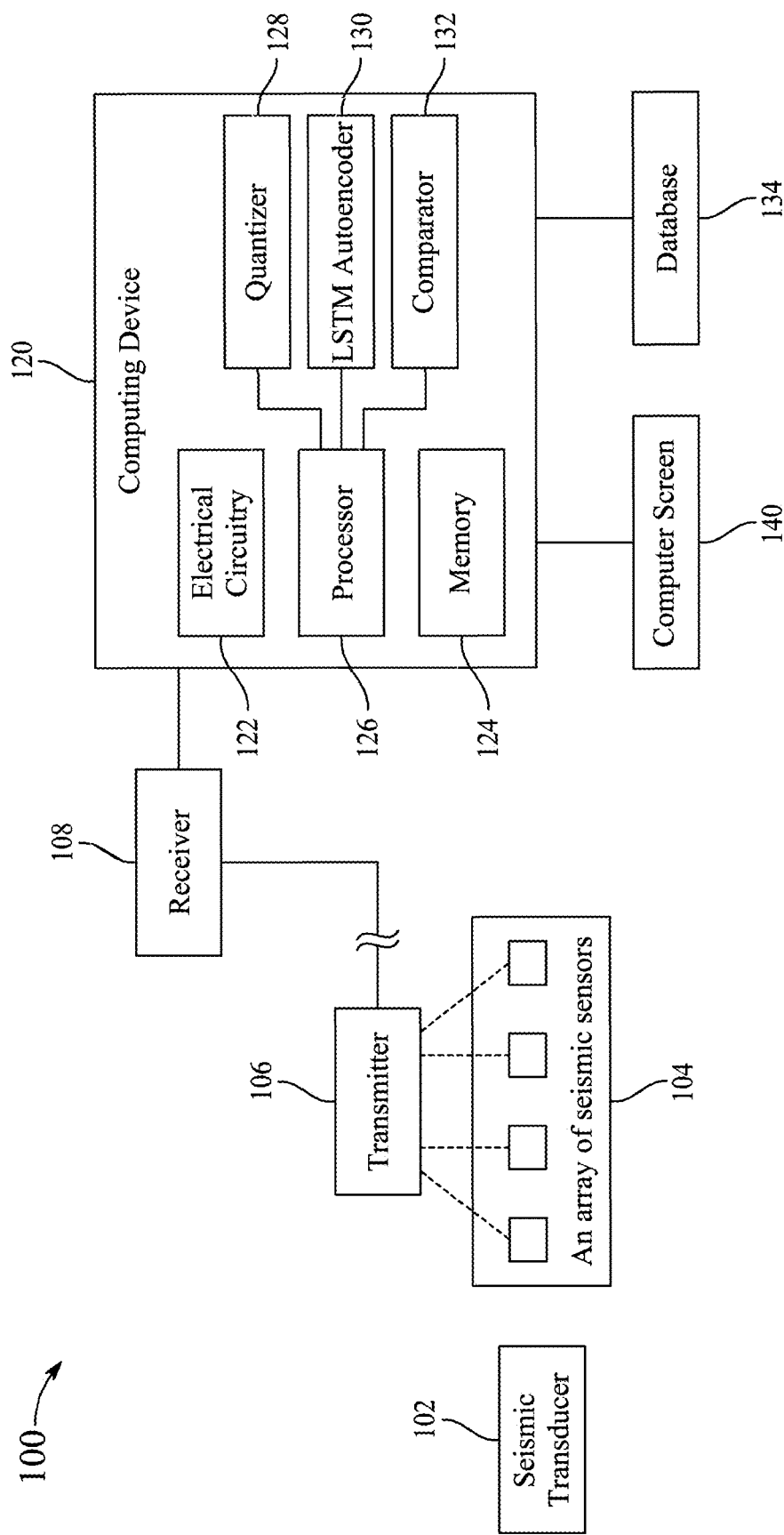
FIG. 1 is a schematic block diagram of a system for performing a seismic survey of a geological formation, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately", "approximate", "about" and similar terms generally refer to ranges that include the identified value within a margin of 20%, 10%, or preferably 5%, and any values therebetween.

Seismic surveys are conducted by deploying at least one seismic source and a plurality of seismic sensors at predetermined locations in a geological formation. The seismic source generates seismic waves (seismic source wavelet), which propagate into the geological formation, creating pressure changes and vibrations along the way. Changes in the elastic properties of the geological formation scatter the seismic waves, changing their direction of propagation and other properties. Part of the energy (either reflected or refracted) emitted by the seismic source reaches the seismic sensors. Some seismic sensors are sensitive to pressure changes (hydrophones), others to particle motion (e.g., geophones and/or accelerometers). The sensors generate electrical signals to produce seismic data in response to the detected seismic events. Analysis of the seismic data can then indicate the presence or absence of probable locations of hydrocarbon deposits and details of the geological formation underlying the substrate of the area of interest.

Various field operations can be performed at the geological location, such as exploration procedures, including core sampling, drilling test bores, drilling boreholes to access a particular layer of the strata, drilling wells to access oil, gas or water layers. Each of these types of field operations uses reconstructed seismic data to determine the types of equipment and the parameters of the use of the equipment in order to perform the field operation.

The seismic survey may be performed before, during or after drilling operations have been performed in the geological formation. The seismic survey may monitor the subsurface strata for movement, such as during earthquakes or during explosive testing. The reconstructed seismic data can be used to identify shifting of the subsurface strata so that countermeasures can be taken.

During drilling operations, accurate information as to the types and locations of the subsurface strata is needed. The reconstructed seismic data can be used to identify rock, water, shale, gas and oil layers within the geological formation. The speed of drilling, the types of drill bits and the velocity of injected water and mud are parameters which are dependent on knowledge of the subsurface strata. In an example, a length of a drill string may be chosen based on knowledge of the depth of a shale layer within the geological location.

In an aspect of the present disclosure, the reconstructed seismic data is used to identify the thickness and depth of a shale layer within the geological formation. This information is needed to determine the length of the drill string and the types of drill bits needed on a drilling tool located on the end of the drill string.

In an aspect of the present disclosure, the reconstructed seismic data is used to identify the thickness and depth of rock layers within the geological formation. This information is needed to determine the type of drill bit needed on a drilling tool located on the end of the drill string during drilling through a rock layer which lies above a shale layer.

In an aspect of the present disclosure, the reconstructed seismic data is used to determine the velocity at which a drilling tool can be lowered into a wellbore during a drilling operation.

In an aspect of the present disclosure, the reconstructed seismic data can be used to determine a volume of hydrocarbon product which can be recovered from a shale layer within the geological formation. This information may be used in determining drilling locations which will produce enough hydrocarbon product to offset the cost of drilling.

In an aspect of the present disclosure, the reconstructed seismic data can be used to determine a volume of water which can be recovered from a water layer within the geological formation. This information may be used in urban planning to determine housing density on a surface of the geological region.

In an aspect of the present disclosure, the reconstructed seismic data is used to identify shifting of the subsurface strata due to an earthquake. This information can be used to determine regions of the surface which may collapse during or after the earthquake. Medical and rescue operations may use this information to determine evacuation routes which avoid the collapsed regions or to send personnel and equipment to the collapsed regions to rescue those trapped in fallen buildings.

The method and system of the present disclosure may be used in combination and tied to the equipment, method and system used in a geologic environment such as those described in US 2022/0120928 which is incorporated herein by reference, in a particular the system components described in FIGS. 1-2 and 5-6.

Successful seismic imaging and inversion of subsurface structures depends on the quality of the acquired seismic data. However, in the field seismic data is often corrupted by various types of random and coherent noise. The signal must be reconstructed from noisy data as well as interpolated for the missing content prior to imaging. Seismic data processing requires careful interpolation or reconstruction to restore the regularly or irregularly missing seismic traces. In practice, seismic data with consecutively missing seismic traces are quite common, which leads to a great challenge for conventional interpolation or reconstruction methods. To effectively reconstruct the seismic data, the present disclosure describes an efficient deconvolution method that employs a long short-term memory (LSTM) autoencoder by utilizing a multichannel structure of a seismic section and band-limited/sparse characteristics of the seismic source wavelet. The LSTM autoencoder is a type of recurrent neural network (RNN) that can learn long-term dependencies in data. The seismic trace is well-suited for use with the LSTM autoencoder due to the high correlation between the samples. The LSTM autoencoder is configured to select various parameters (number of layers, weights, biases) based on a selectivity analysis. In an aspect, quantized data is used to recover the seismic reflectivity. Simulations with a field dataset and a synthetic data set illustrate that the method of the present disclosure gives fast and high quality deconvolution results. In comparison with conventional reconstruction methods, the methods of the present disclosure outperform the conventional steepest decent (SD) and basis pursuit (BP) methods in both the deconvolution result and computational efficiency.

Aspects of this disclosure are directed to a system and a method for performing a seismic survey of a geological formation. The system of the present disclosure includes a long short-term memory (LSTM) autoencoder for accurate seismic deconvolution in a multichannel setup. The LSTM autoencoder is configured to compress seismic data. The system yields a robust estimation ensuring the recovery of sparse reflectivity from acquired seismic data that have been under-quantized. By adjusting the quantization error, the system considerably improves the robustness of data to the quantization error, thereby boosting the visual saliency of seismic data compared to the other conventional systems. In an aspect, the system has been validated using a field data set and a synthetic seismic data set, and the assessment was carried out by comparing the system of the present disclosure to conventional systems such as the steepest descent method and the basis pursuit method. The comparison illustrates that the system of the present disclosure outperforms the conventional systems significantly in following ways: first, during estimation, fraudulent or overly emphasized estimated impulses are significantly suppressed, and second, the estimate is much more robust to quantization interval changes. The performance test on the real data set and the synthetic data set revealed that the LSTM autoencoder-based method/system yields good results in terms of both quality and computational complexity when compared with conventional methods/systems.

In various aspects of the disclosure, the definitions of one or more terms that will be used in the document are provided below.

The term "quantization" refers to the process of mapping continuous infinite values to a smaller set of discrete finite values. In simulation and embedded computing, quantization involves approximating real-world values with a digital representation that introduces limits on the precision and range of a value. Quantization introduces various sources of error in the calculations such as rounding errors, underflow or overflow, computational noise, and limit cycles. Quantization results in numerical differences between an ideal system behavior and a computed numerical behavior.

The term "underflow" refers to a type of precision loss during quantization. Underflows occur when the discrete finite value is smaller than the smallest value representable by the data type. When this occurs, the value saturates to zero.

The term "overflow" is another type of precision loss during quantization. When a value is larger than the largest value that a data type can represent, an overflow occurs. When an overflow occurs, the value saturates to the largest value representable by the data type.

The term "conundrum" refers to a confusing and difficult problem or question. For example, for proper reconstruction of a signal, choosing an appropriate quantization is a conundrum.

The term "$\ell_1$ normalization" refers to a normalization technique that modifies values of a dataset in such a way that in each row the sum of the absolute values will always add up to 1. It is also called the least absolute deviation method.

The term "convolution" refers to multiplying two arrays of numbers, generally of different sizes, but of the same dimensionality, to produce a third array of numbers of the same dimensionality. In the present disclosure, the term convolution refers to a process by which a wavelet combines with a series of reflection events to produce a seismogram that is recorded in a seismic survey. The seismogram, s(t), is a wavelet, w(t), convolved with a reflectivity, r(t), and noise, n(t), can be represented as: s(t)=w(t)*r(t)+n(t).

The term "deconvolution" refers to an inverse convolution process that removes the effect of the wavelet from the seismogram. Deconvolution attempts to compress the wavelet, thereby increasing the resolution of the seismic data. An objective of the deconvolution is to produce a wavelet with a simple phase character, ideally a zero-phase wavelet, which is the same for every trace in the seismic dataset.

The term "spikiness" is defined as points on the seismic trace which indicate signals of high intensity. These high intensity spikes indicate layers of high density within the strata of the geological formation. For example, sand layers and water layers are of low density and are not good reflectors, therefore the seismic wavelet reflected from these layers will not have a high magnitude. Conversely, a seismic wavelet reflected from a rock or shale layer will have a large intensity, as these layers are very dense.

FIG. 1 is a schematic block diagram of a system 100 for performing a seismic survey of a geological formation, according to certain embodiments.

Referring to FIG. 1, the system 100 includes a seismic transducer 102, an array of seismic sensors 104, a transmitter 106, a receiver 108, a computing device 120, a quantizer 128, a comparator 132, a trained long short-term memory (LSTM) neural network based autoencoder 130, a database 134, and a computer screen 140.

In the present disclosure, the following terms are defined:

A seismic source wavelet is defined as an ultrasonic wave induced by a seismic transducer.

A reflected or refracted seismic wavelet is defined as the resultant waves after reflection or refraction of the seismic source wavelet from strata of the geological formation.

A seismic signal is defined as a signal generated by a seismic sensor which transduces the the seismic source wavelet, the reflected wavelets and the refracted wavelets into electrical signals.

A seismic trace is a recording of the electrical signals generated by the seismic sensors during a time window. The seismic trace may be directly drawn on graph paper by a seismograph, displayed on a display screen and/or may be stored in a memory of a computing device.

Reconstructed seismic data is a resultant signal after removing the seismic source wavelet and the noise from the electrical signals generated by the seismic sensors.

The seismic transducer 102 is located at a surface of the geological formation. The seismic transducer 102 is configured to generate seismic source wavelets (a seismic wave front or seismic source waves) within the geological formation. In an aspect, the seismic transducer 102 is a part of an array of seismic transducers. Due to different strata of the geological formation, the seismic wavelets are refracted and reflected from the strata. The seismic surveys are performed by using the refracted and reflected seismic wavelets. For example, the seismic source wavelet emitted/generated by the seismic transducer 102 may interact with a layer (e.g., a structure, an interface, etc.) in the geological formation such that a portion of the source wavelet is reflected, which may then be sensed by one or more the sensors of the array of seismic sensors 104. In an example, such reflected wavelet (energy) may be known as a primary wave. In some examples, a portion of the source wavelet may be reflected by more than one structure in the geological formation which is received as multiple reflected waves. In an example, the seismic transducer 102 may be a truck-mounted or buggy-mounted device, an electronically driven vibrational system, a seismic vibrator, a seismic air gun, or an explosive device. For example, the seismic transducer 102 may be a vibrator truck, an air gun, a thumper truck, a plasma sound source, and a seismic vibrator boomer source. In an aspect, the seismic transducer 102 is a continuously driven source, a pulsed source, or a combination thereof. The seismic transducer 102 can be deployed at a regular distance or a random distance along a length of the geological formation. In an example, the array of seismic transducers may be configured to generate the seismic source wavelet sequentially at discrete time intervals, or multiple seismic transducers may be shot simultaneously (e.g., within a few milliseconds of each other) to generate the seismic source wavelets.

The array of seismic sensors 104 is placed at various locations at a surface of the geological formation or near the geological formation. The array of seismic sensors 104 is configured to detect the reflected and/or refracted seismic wavelets (also referred to as reflected and/or refracted seismic waves) and generate seismic signals which form seismic traces. In an example, a seismic trace refers to a recorded curve generated by a seismic sensor when measuring ground movement. The seismic traces include the seismic source wavelet convolved with seismic waves reflected or refracted from the geological formation added with a noise signal. In an example, the reflected seismic wavelets are the primary wave (the source wavelet) or the multiple reflected waves or a combination thereof. For example, the seismic sensor may be a geophone, a digital seismograph, or a hydrophones. Each of the seismic sensors includes at least two main modules, a data acquisition module and a communications module. The data acquisition module is configured to record the reflected and/or refracted seismic wavelets as seismic signals and process the recorded the seismic signals to generate the seismic traces. The communications module is used to transmit the seismic traces to the transmitter 106. In an aspect, the communications module may employ a smart reconfigurable antenna for wirelessly communicating with the transmitter 106. In an example, the array of seismic sensors 104 includes a memory and a data processor configured to collect the seismic traces from each seismic sensor and transmit the seismic traces to the transmitter 106 as a recorded data set (a collection of seismic traces). Downstream analysis of the seismic traces can be processed to indicate the presence or absence of probable locations of hydrocarbon deposits, a seismic event, such as an earthquake, etc. Additionally, the seismic transducer 102 and the seismic sensors 104 may be used to generate the seismic traces to monitor hydrocarbon production from a subterranean reservoir and/or other fluid flow within the reservoir.

The transmitter 106 is operatively connected to each of the seismic sensors 104 of the array of seismic sensors 104.

The transmitter 106 is configured to receive the generated seismic traces from each of the seismic sensors 104. In an aspect, the transmitter 106 is configured to receive the recorded data set from the array of seismic sensors 104. In an example, the recorded data set is a set of seismic traces (time series from the different seismic receivers). The recorded data set may be used in creating an image of the subsurface, which is then interpreted for oil and gas exploration. The transmitter 106 is configured to transmit, through a wired or a wireless connection, the received seismic traces over a communication network.

The receiver 108 is configured to receive the seismic traces from the transmitter 106. The receiver 108 includes at least one antenna and may include a plurality of antennas and a plurality of types of antennas, such as directional antennas, antennas configured to receive cellular communication, such as LTE, 3G, 4G, 5G, antennas configured to receive WiFi communications and antennas configured to receive near field communications, such as Bluetooth. In an aspect, the receiver 108 and the transmitter 106 are connected by a wire connection or a wireless connection. On receiving the seismic traces, the receiver 108 generates a set of seismic time-series traces. The receiver 108 is configured to receive the seismic traces in time window sets. In a non-limiting example, the receiver 108 receives the seismic traces in a time window of 10 seconds after stimulating the geological formation by the seismic transducer 102. In an alternate example, the receiver 108 is configured to receive the seismic traces from each seismic sensor, respectively. In such case, each seismic sensor acts as an individual channel and has its own transmitter.

The receiver 108 is connected to the computing device 120. The computing device 120 includes electrical circuitry 122, a memory 124, and a processor 126. The electrical circuitry 122 is configured to preprocess the received data (the series of seismic traces), by filtering and amplifying the received data.

The memory 124 is configured to store the preprocessed data and computer-readable program instructions for performing the seismic survey of the geological formation. The memory 124 is configured to store a plurality of sets of seismic time-series traces, the computer-readable program instructions, and the like. The memory 124 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

The processor 126 is configured to fetch and execute the computer-readable program instructions stored in the memory 124. The processor 126 is configured to execute a sequence of machine-readable instructions, which may be embodied in a program or software. The instructions can be directed to the processor 126, which may subsequently execute the instructions to implement the methods of the present disclosure. The processor 126 may be implemented as one or more microprocessors, microcomputers, microcontrollers, digital signal processors, central processing units, state machines, logic circuitries, and/or any devices that manipulate signals based on operational instructions.

In an aspect, the computing device 120 includes a network communication module for facilitating communication with other devices and one or more communication networks, such as the Internet, other wide area networks, local area networks, metropolitan area networks, near field networks, cellular networks and the like.

The quantizer 128 is operatively connected to the processor 126. The quantizer 128 is configured to compress the set of seismic time series traces by randomly selecting a sparse subset of samples of the set of seismic time-series traces. In an example, the quantizer 128 is configured to randomly select less than 20 samples of each seismic time-series trace. In another example, the quantizer 128 is configured to randomly select less than 30 samples of each seismic time-series trace. The quantizer 128 is configured to quantize the randomly selected subset of samples.

The quantizer 128 is configured to store N binary bits of each sample of the randomly selected subset. The quantizer 128 determines a maximum value Y of each stored sample. After determining the maximum value of Y, the quantizer 128 is configured to select a scaling factor. For example, the scaling factor is greater than zero and less than or equal to one. The quantizer 128 is further configured to determine a quantization interval q by multiplying the scaling factor by the maximum value Y. In an example, the quantizer 128 is configured to select the scaling factor from one of the following:

the scaling factor is 0.2 and the quantization interval q is 0.2Y, the scaling factor is 0.3 and the quantization interval q is 0.3Y, the scaling factor is 0.6 and the quantization interval q is 0.6Y, and the scaling factor is 0.8 and the quantization interval q is 0.8Y.

In an aspect, the computing device 120 is configured to calculate a compression gain $C_r$ by multiplying the N binary bits by a ratio of a base 2 log of q divided by a base 2 log of 2Y. The upper bound of the compression gain $C_r$ is limited by an absolute value of a quantization error to be less than one half of the quantization interval q.

The trained LSTM neural network based autoencoder 130 ("neural network based autoencoder 130") is operatively connected to the processor 126. The neural network based autoencoder 130 employs a self-supervised learning model that is configured to generate a compressed representation of the input data. The neural network based autoencoder 130 is an implementation of an autoencoder for sequence data using an encoder-decoder LSTM architecture. For a given dataset of sequences, an encoder-decoder LSTM is configured to read the input sequence, encode the input sequence, decode the input sequence, and recreate the input sequence. The neural network based autoencoder 130 is configured to learn a compressed representation of sequence data. The neural network based autoencoder 130 is configured to deconvolve the randomly selected subset of samples and generate a deconvolved randomly selected subset of samples.

The computing device 120 is operatively connected to the computer screen 140 and the Neural network based autoencoder 130. The computing device 120 is configured to receive the generated deconvolved randomly selected subset of samples from the Neural network based autoencoder 130. The computing device 120 is configured to reconstruct the seismic waves reflected and/or refracted from the geological formation from the deconvolved randomly selected subset of samples. Further, the computing device 120 renders the reconstructed seismic waves reflected and/or refracted from the geological formation on the computer screen 140.

The computing device 120 may be any device, such as a desktop computer, a laptop, a tablet computer, a smartphone, a mobile device, a Personal Digital Assistant (PDA) or any other computing device. The computing device 120 facilitates in performing reconstruction of the seismic waves reflected from the geological formation.

The comparator 132 is configured to compare a magnitude of the reconstructed seismic waves reflected and/or refracted from the geological formation to a threshold value, fetched from the memory 124. When the magnitude is greater than or equal to the threshold value, the comparator 132 identifies spikiness in the magnitude.

The database 134 is communicatively coupled with the comparator 132 and the computing device 120. The database 134 is configured to store records which relate patterns of spikiness to structures in the geological formation.

Based on the program instructions, the computing device 120 is further configured to identify the pattern of spikiness as one of a fault, a layer, a changed composition of a layer, an oil layer, a sand layer and a rock layer. The computing device 120 is configured to determine the pattern of the spikiness and compare the pattern of spikiness to a record stored within the database 134 to identify at least one structure of the geological formation. The computing device 120 is configured to identify at least one layer of the geological formation and at least one fault in the geological formation from the identified spikiness.

The system 100 of the present disclosure is configured to model the recorded seismic trace as a linear system in which the impulse response of the seismic waves reflected and/or refracted from the geological formation is convoluted with the seismic source wavelet. The j-th received seismic trace, in particular, is given as follows:

$$x_j[n] = w[n] * r_j[k] + z_j[n] = \sum_k w[n-k]r_j[k] + z_j[n], j=1, \ldots, J, \quad (1)$$

where * represents the convolution operation, w[n] denotes the seismic source wavelet and $r_j[k]$ denotes a reflectivity model with "J" as the number of channels.

Before investigating the effect of noise $z_j[n]$, a noiseless scenario may be considered.

The z-transform is a mathematical tool which is used to convert difference equations in time domain into the algebraic equations in a z-domain. The z-transform is a very useful tool in the analysis of a linear shift invariant (LSI) system. An LSI discrete time system is represented by difference equations. To solve these difference equations which are in time domain, the equations are converted first into algebraic equations in the z-domain using the z-transform, then the algebraic equations are manipulated in z-domain and the result obtained is converted back into the time domain using an inverse Z-transform.

The z-transform of $x_j[n]$ in the noiseless version of equation (1), i.e., $z_j[n]=0$, gives $$X_j(z) = W(z)R_j(z). \quad (2)$$

Similarly, the z-transform of $x_i[n]$ gives:

$$X_j(z) = W(z)R_i(z). \quad (3)$$

By multiplying equations (2) and (3) by $R_i(z)$ and $R_j(z)$, respectively, it can be concluded that the succeeding system of linear equations can be acquired by considering equation (2) for two seismic traces:

$$X_j(z) = W(z)R_j(z) - X_j(z) = W(z)R_i(z) = 0, \text{ for } i \neq j, \quad (4)$$

which can be rewritten in matrix form as follows:

$$X_i r_j - X_j r_i = 0, \quad (5)$$

where $X_j$ represents the j-th channel convolution matrix, $r_j=[r_j[1], \ldots, r_j[N]]^T$ is the vectorized reflectivity and N represents the samples in a seismic trace. Combining all instances of equation (5) into one equation results in:

$$Ar = 0, \text{ where} \quad (6)$$

$$A = \begin{bmatrix} X_2 & -X_1 & & & \\ X_3 & & -X_1 & & \\ X_4 & & & -X_1 & \\ \vdots & & & & \ddots \\ & X_3 & -X_2 & & \\ & X_4 & & -X_2 & \\ & X_5 & & & -X_2 \\ & \vdots & & & \ddots \end{bmatrix} \quad (7)$$

and $r=[r_1^T, r_2^T, \ldots, r_J^T]^T$ The modification for the additive noise scenario is:

$$Ar = e; \quad (8)$$

however, the noise vector e is neither white noise nor Gaussian noise.

By employing fewer quantization levels, the seismic data volume can be compressed. In such case, the compression gain $C_r$ is defined as the number of bits used by the original seismic trace divided by the number of bits used by the quantized seismic trace. The compression gain $C_r$ is calculated as follows:

If N binary bits are used to store each sample of the original seismic trace, then the quantization interval (q) is defined as $q=\delta Y$, where $0<\delta \leq 1$ is the scaling factor, and Y is the maximum absolute value of the voltage of the sample. Hence, the codewords are $(2/\delta)+1$ in size, and each quantized seismic sample is represented by a $\lceil \log_2[(2/\delta)+1] \rceil$ number of bits. The compression gain $C_r$ is given by:

$$C_r(q, N) = N/\log[(2Y/q)+1] \approx N/\log_2 2Y \log_2 q. \quad (9)$$

The compression gain $C_r$ increases exponentially with the quantization interval (q) value, as can be seen from equation (9). A quantization error, $e_i$ defined as the difference between the quantized sample of the seismic trace and the original sample of the seismic trace, i.e., $e_i=x_i-x_i'$, has an upper-bound determined by the q value:

$$|e_i| \leq 1/2 * q \quad (10)$$

and, similarly, the $l_2$-norm of the error quantization vector, $e=x-x'$ may be given as:

$$\|e\|_2 \le \frac{1}{2}q\sqrt{m}, \tag{11}$$

where m is the number of samples in a seismic trace.

Equation (11) shows a trade-off between the increased compression gain and an adequate preservation of the signal quality, which applies to all lossy compression strategies. Two conundrums are linked with the value of q under an application domain, that is, the reflectivity estimation. The present system 100 effectively calibrates the trade-off between accuracy and compression. By integrating the quantization into a convolution model (such as the neural network based autoencoder 130), the seismic quantized trace (x') is characterized as a linear system with admixture of bounded noise (e):

$$x' = wr + e \tag{12}$$

The system 100 is configured to locate a sparse linear combination of basic elementary signals which is impacted by a confined quantization error (limited error). In summary, the system 100 is configured to observe a signal x' and its linear model using equation (12), and approximate the coefficient vector r. The coefficient vector r represents the reflected wave part of the seismic trace, which is required to reconstruct the geological formation.

Figure 2A:
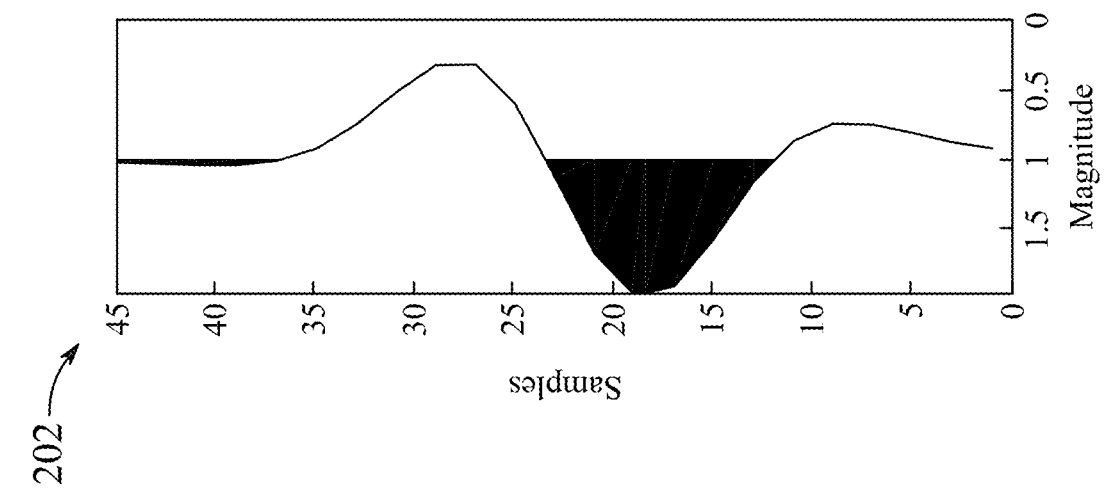
FIG. 2A is an exemplary representation of a seismic source wavelet, according to certain embodiments.

FIG. 2A is an exemplary representation 202 of the seismic source wavelet (source seismic signal) generated by the seismic transducer 102.

Figure 2B:
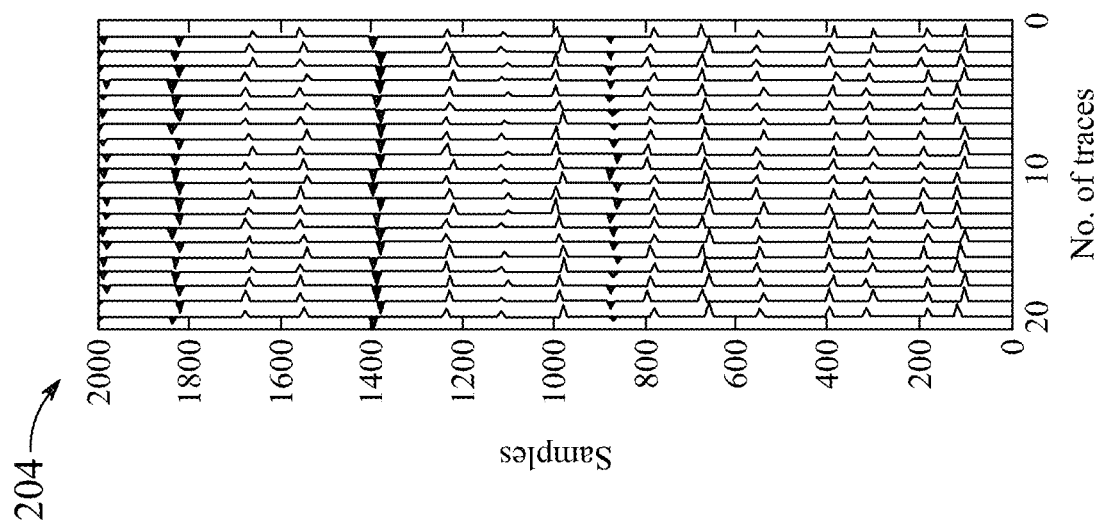
FIG. 2B is an exemplary representation of a reflectivity series, according to certain embodiments.

FIG. 2B is an exemplary representation 204 of a reflectivity series. The reflectivity series is defined as a series which includes the primary reflection coefficients of the subsurface together with the impulses which represent multiple reflections. The reflectivity series represents the reflections from the geologic structure received during the time window.

Figure 2C:
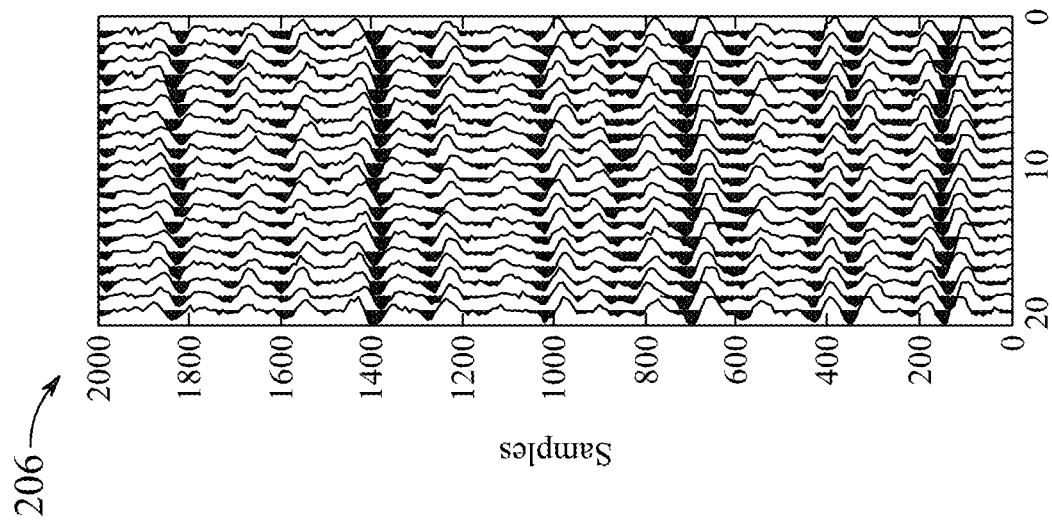
FIG. 2C is an exemplary representation of recorded seismic traces, according to certain embodiments.

FIG. 2C is an exemplary representation 206 of the recorded seismic traces. In an example, the recorded seismic traces includes the seismic source wavelet, the reflected seismic waves and the noise (transmission noise, receiver noise, or noise due to environmental conditions). In this figure, 20 seismic traces were recorded. The term "samples" is related to a time record when the array of seismic sensors 104 (seismographs) record the measurement. In an aspect, the recorded seismic traces are obtained by convolving the seismic source wavelet with the reflectivity series.

Figure 3:
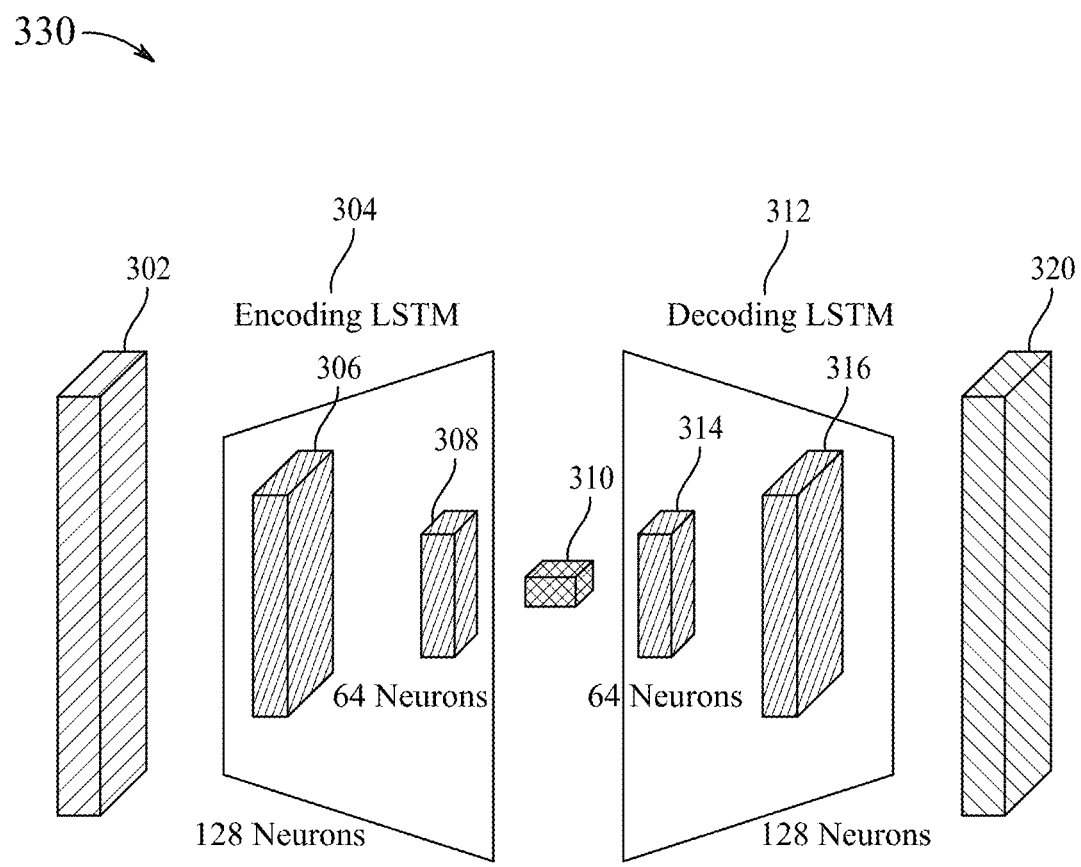
FIG. 3 is a schematic architecture diagram of a trained long short-term memory (LSTM) neural network based autoencoder, according to certain embodiments.

FIG. 3 is schematic architecture diagram of the trained LSTM neural network based autoencoder 330 ("autoencoder 330"). As shown in FIG. 3, the autoencoder 330 includes five LSTM layers: an input layer 302, an encoding layer 304, a feature extraction layer 310, a decoding layer 312, and an output layer 320. The LSTM layers are configured to perform the encoder/decoder functions. In the autoencoder 330, an LSTM layer is a recurrent neural network (RNN) layer that learns long-term dependencies between time steps in time series and sequence data. The LSTM layer performs additive interactions, therefore improving gradient flow over long sequences during training.

A LSTM cell has a hidden state where $h_{(t-1)}$ represents the hidden state of the previous timestamp and $h_t$ is the hidden state of the current timestamp. The LSTM cell has a cell state represented by $c_{(t-1)}$ and $c_t$ for the previous and current timestamps, respectively.

The input layer 302 is configured to receive the compressed set of seismic time series traces (randomly selected subset of samples) from the processor 126. The autoencoder 330 is configured to deconvolve the randomly selected subset of samples and generate the deconvolved randomly selected subset of samples.

The encoding layer 304 includes two layers: a first layer 306 having 128 neurons, and a second layer 308 having 64 neurons. The encoding layer 304 is configured to encode the received samples. The encoding layer 304 (encoder LSTM model) reads the input sequence step-by-step. After reading the entire input sequence, the encoding layer 304 outputs an internal learned representation of the entire input sequence as a fixed-length vector.

The feature extraction layer 310 is configured to receive the output from the encoding layer 304. The feature extraction layer 310 is configured to provide encoded features from the received output.

The decoding layer 312 includes two layers: a first layer 314 having 64 neurons, and a second layer 316 having 128 neurons. The decoding layer 312 is configured to receive the fixed-length vector as an input received from the encoder model. The decoding layer 312 interprets the received vector in each step and generates an output sequence.

The output layer 320 is configured to generate predicated data (a deconvolved randomly selected subset of samples).

The LSTM layers are configured to operate with time series and sequence data and learn extended correlations among time steps. The layer state includes a cell state $c_t$ and a hidden state (also known as the output state) $h_t$. The output of the LSTM layer for time step t is stored in the hidden state at that time. Information from previous time steps is stored in the cell state. The layer updates the cell state at each time step by adding or removing the information. The layer uses a number of gates for controlling the updates. In an example, the LSTM layer is configured to learn a number of parameters. In an aspect, the parameters are selected as a bias b (Bias), the recurrent weights V (RecurrentWeights), and the input weights p (InputWeights). In an example, a matrix is generated for each parameter (bias, the recurrent weights, the input weights, of each component) and the generated matrices are concatenated.

The following equations illustrate the steps of concatenation of the generated matrices:

$$b = \begin{bmatrix} b_i \\ b_f \\ b_g \\ b_o \end{bmatrix}, V = \begin{bmatrix} V_i \\ V_f \\ V_g \\ V_o \end{bmatrix}, p = \begin{bmatrix} p_i \\ p_f \\ p_g \\ p_o \end{bmatrix}, \tag{13}$$

where o, g, f and i denote the output gate, cell candidate, forget gate and input gate, respectively. At time step t, the cell state $c_t$ is updated as:

$$c_t = f_t \odot c_{t-1} + i_t \odot g_t, \tag{14}$$

where the symbol $\odot$ represents the element-wise multiplication of vectors, i.e., the Hadamard product. The Hadamard product (also known as the element-wise product) is a binary operation that takes two matrices of the same dimensions and produces another matrix of the same dimension as the operands.

At time step t, the hidden state is updated as:

$$h_t = o_t \odot \sigma_c(c_t), \qquad (15)$$

where $\sigma_c$ represents the state activation function. In an example, the activation function updates the cell and hidden state. In some examples, the activation function is applied to gates. The state activation function of a node defines an output of that node given for an input or set of inputs. The activation function is responsible for transforming a summed weighted input from a node into the activation of the node and defines the specific output or "activation" of the node. The activation functions are used to get the outputs from the nodes.

In an aspect, the LSTM layer applies a softsign function as the state activation function in order to compute the state activation function, i.e., $$\text{softsign}(x) = \frac{x}{1 + |x|}. \qquad (16)$$

The outputs of the LSTM are the reflectivity traces with the noise removed. The following relations describe the components of the LSTM layer at time step t. The hidden and cell states of the layer are controlled by the following components:

1. Output gate (o): controls the cell state level that is added to the hidden state;
2. Cell candidate (g): adds information to the cell state;
3. Forget gate (f): controls the level of cell state reset (forget);
4. Input gate (i): controls the level of cell state update.

Output gate: $o_t = \sigma_g(p_o x_t) + V_o h_{(t-1)} + b_o$ (17)

Cell candidate: $g_t = \sigma_g(p_s x_t) + V_g h_{(t-1)} + b_g$

Forget gate: $f_t = \sigma_g(p_f x_t) + V_f h_{(t-1)} + b_f$

Input gate: $i_t = \sigma_g(p_i x_t) + V_i h_{(t-1)} + b_i$

The gate activation function is denoted by $\sigma_g$ in these calculations. In an example, the LSTM layer employs a hard-sigmoid function as the activation function. The hard-sigmoid function is piece-wise linear approximation of the sigmoid function. A hard sigmoid is non-smooth function which used in place of a sigmoid/softsign function to retain the basic shape of a sigmoid, but using simpler approximation functions such as piecewise linear functions which are preferred where speed of computation is more important than precision. The hard-sigmoid function used by the LSTM layer function is given by:

$$\sigma_x = \begin{cases} 1 & \text{if } x > 2.5 \\ 0 & \text{if } x < -2.5 \\ 0.2x + 0.5 & \text{if } -2.5 \le x \le 2.5 \end{cases} \qquad (18)$$

Examples and Experiments

The following examples are provided to illustrate further and to facilitate the understanding of the present disclosure.

Experimental Data and Analysis

First Experiment: Determining the performance of the present system, the basis pursuit (BP) method, and the steepest decent (SD) method.

During the first experiment (synthetic simulation), a quantization interval Q=0.8Y was taken and a synthetic data set was used. The quantization interval Q is defined as defined as Q=δY, where 0<δ≤1 is the scaling factor and Y is the sample's maximum absolute value. During the synthetic simulation, the scaling factor is 0.8.

FIG. 4A-FIG. 4F illustrate deconvolution result for Q=0.8Y using the conventional methods (BP method and SD method) and the method as disclosed in the present disclosure.

Figure 4A:
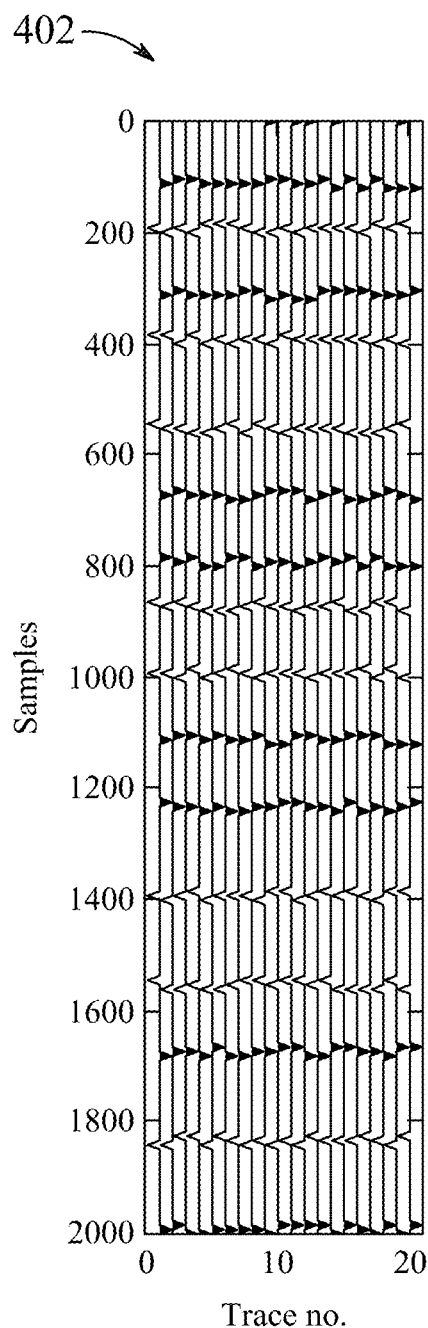
FIG. 4A is an exemplary representation of true reflectivity during synthetic simulation, according to certain embodiments.

During the synthetic simulation, 20 seismic traces were generated using the true reflectivity as shown in FIG. 4A-FIG. 4F. FIG. 4A is an exemplary representation 402 of true reflectivity (reflectivity series) during the synthetic simulation. The reflectivity series has a sampling frequency of 500 Hz. The 20 traces are the received signals at different sensors.

Figure 4B:
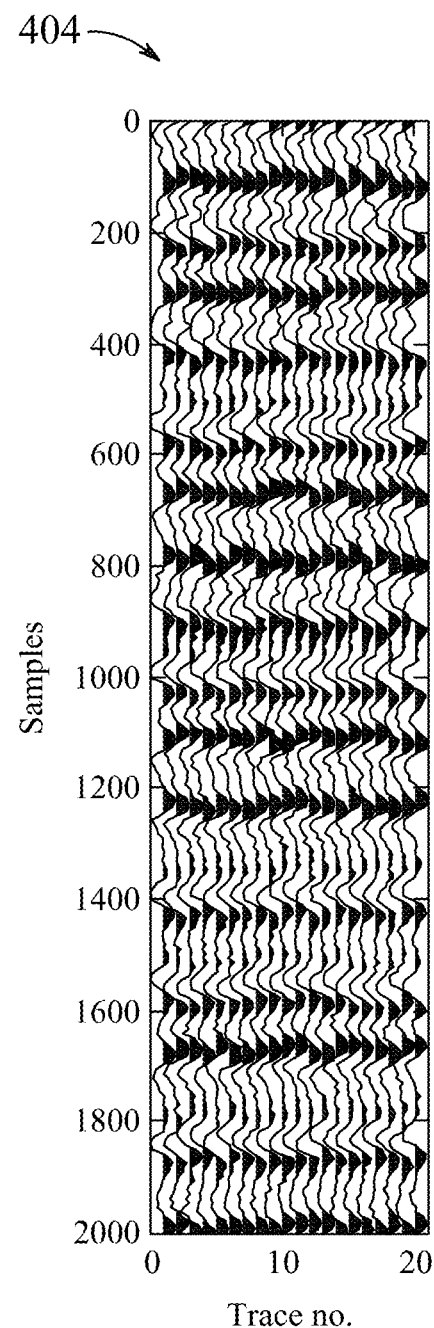
FIG. 4B is an exemplary representation of received data (seismic traces) during the synthetic simulation, according to certain embodiments.

FIG. 4B is an exemplary representation 404 of the received data (original seismic traces) with SNR=10 dB during the synthetic simulation. The original seismic traces shown in FIG. 4B are the result of the convolution between the Ricker wavelet and the reflectivity series. The Ricker wavelet is a model seismic wavelet, sometimes called a Mexican hat wavelet. In an example, the Ricker wavelet has a center frequency of 40 Hz and a phase shift of 50 degrees. The noise is modeled as the additive white Gaussian noise (AWGN) with an SNR of 10 dB, whereas the SNR is defined for an additive model y=x+z as:

$$SNR = 10 \log_{10}\left(\frac{\|x\|_2^2}{\|z\|_2^2}\right), \qquad (19)$$

where x and z are the signal part and noise part, respectively.

FIG. 4C is an exemplary representation 406 of the deconvolution result with the BP method during the synthetic simulation. The BP method (also known as $\ell_1$ norm minimization method) was developed primarily as a tool to model the behavior of discrete signals using a wide range of functional behaviors. The BP method is used to obtain an accurate and efficient representation of the signal using a minimal number of functions from a large "dictionary" of possible behaviors.

The $\ell_1$ norm minimization method, also known as the least absolute values method (LAVM), is a robust method used for outlier detection in geodetic networks. The $\ell_1$ norm is calculated as the sum of the absolute values of the vector.

The ℓ1 minimization problem and the Embedded Basis Pursuit (EBP) problem are both optimization problems commonly used in signal processing and compressive sensing. They involve finding a sparse representation of a signal or vector.

The ℓ1 Minimization Problem: The ℓ1 minimization problem seeks to find the sparsest solution to an underdetermined linear system of equations. Given a measurement vector y and a measurement matrix A, the problem can be formulated as: minimize $\|x\|_1$ subject to y=Ax where $\|x\|_1$ denotes the ℓ1 norm of the vector x. The objective is to find a sparse solution x that satisfies the linear equation y=Ax with the smallest ℓ1 norm.

The $\ell 1$ minimization problem is commonly used in compressive sensing, where the number of measurements is much smaller than the signal's dimensionality. It exploits the sparsity of signals to recover them accurately from incomplete measurements.

The Embedded Basis Pursuit (EBP) Problem: The EBP problem is an extension of the $\ell 1$ minimization problem that incorporates a priori knowledge about the sparsity pattern of the signal. It aims to find a sparse representation of a signal using a known set of basis functions.

In the EBP problem, instead of directly seeking a sparse solution in the standard basis, the goal is to find a sparse representation using a predefined dictionary or basis matrix $\Psi$. The problem can be formulated as: minimize $\|x\|_1$ subject to $y=\Psi x$ where $\Psi$ is the dictionary or basis matrix, x is the sparse representation, and y is the measurement vector.

By incorporating a specific basis matrix, the EBP problem allows for more accurate and meaningful sparse representations of signals. It can leverage domain-specific knowledge and improve the performance of sparse signal recovery.

Both the $\ell 1$ minimization problem and the EBP problem are important in signal processing applications, such as compressive sensing, image and audio processing, and sparse signal recovery, where efficiently recovering sparse representations is crucial.

An $\ell_2$-norm is calculated as the square root of the sum of the squared vector values. The use of measurement weight in the $\ell_1$-norm method is different from the $\ell_2$-norm method. The weight of measurements directly reflects the solution in the $\ell_2$-norm method, whereas the weight of measurements is not used in the non-redundant solutions, as obtained by the $\ell_1$-norm method. Once the solutions of the combination are obtained, then these weights are used in determining the optimal solution. The relationship between measurements and the unknown parameters is established by the $\ell_2$-norm.

A number of efficient BP solvers are available to solve the embedded basis pursuit problem in the BP method. In conventional methods, a SPGL1 package is utilized to solve the $\ell_1$ norm minimization problem [See: van den Berg, E.; Friedlander, M. P. "*Probing the Pareto frontier for basis pursuit solutions*". SIAM J. Sci. Comput. 2008, 31, 890-912, incorporated by the reference in its entirety].

FIG. 4D is an exemplary representation 408 of the deconvolution result with the SD method during the synthetic simulation. For the SD method, a deconvolution filter of length 51 was used. The deconvolution filter was initialized with a solitary spike that was located approximately in the middle of the deconvolution filter. Further, other parameters used in the first experiments are given as follows: $\alpha=0.2$, $\epsilon_j=1$, step size $\mu=0.02$, the stopping criterion is marked as 1000 iterations, the hybrid norm parameter $\epsilon_k$ was set to 0.005, and the regularization parameter $\lambda$ is fixed to 2. The iteration count for the SD method is set to 800, ensuring that the SD method reaches a steady state.

Deconvolution is the inverse of convolution. The objective of deconvolution is to estimate and remove the shot wavelet and leave the best possible reflectivity series. It is thus called inverse filtering. The goal of deconvolution is to recreate the signal as it existed before the convolution took place. Deconvolution usually requires the known characteristics of the convolution (i.e., the impulse or frequency response), therefore distinguished from a blind deconvolution, where the characteristics of the parasitic convolution are not known. Deconvolution is difficult to understand in a time domain, but quite simple in a frequency domain. Each sinusoid that composes the original signal can be changed in amplitude and/or phase as it passes through the undesired convolution. To extract the original signal, the deconvolution filter must undo these amplitude and phase changes.

By examining some of the individual reflections and comparing them with the gathered seismic data, compression of the seismic wavelet associated with the significant reflections can be observed. As both low-frequency noise and high-frequency signals are boosted, the seismic data often need filtering with a wide band-pass filter after deconvolution. In addition, trace balancing often is applied after deconvolution to bring the data to a common root-mean-squared (rms) level.

It is common practice to model the seismic trace as a convolution of the reflectivity function of the earth and an energy waveform referred to as the seismic wavelet. The objective of deconvolution is to extract the reflectivity function from the seismic trace. Four techniques (predictive deconvolution, homomorphic filtering, Kalman filtering, and deterministic deconvolution) are conventionally used to accomplish this objective.

Figure 4E:
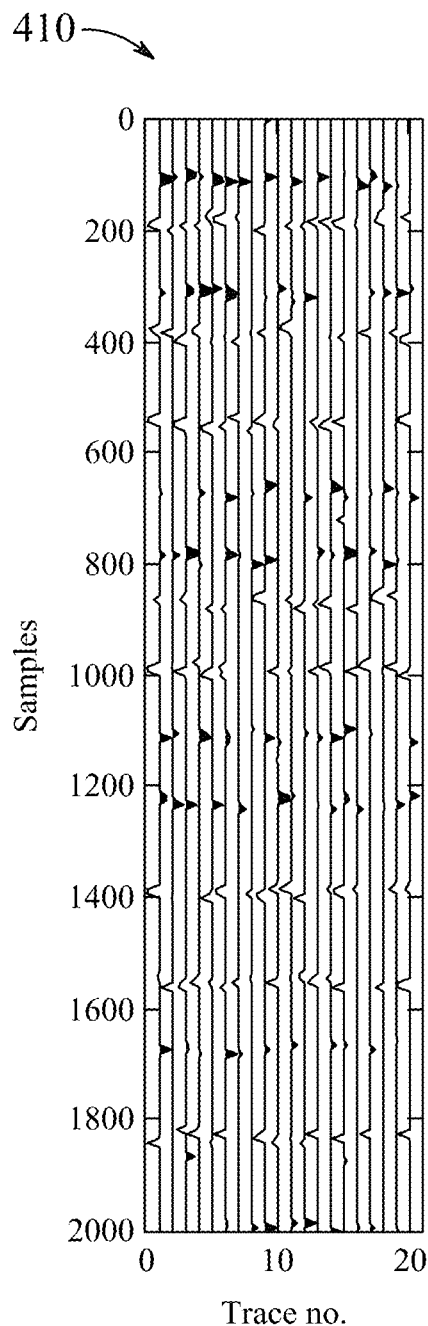
FIG. 4E is an exemplary representation of the deconvolution result with a method for performing the seismic survey in a first iteration ("the method of the present disclosure") during the synthetic simulation, according to certain embodiments.

FIG. 4E is an exemplary representation 410 of the deconvolution result with a method for performing a seismic survey ("method of the present disclosure") in a first iteration during the synthetic simulation.

Figure 4F:
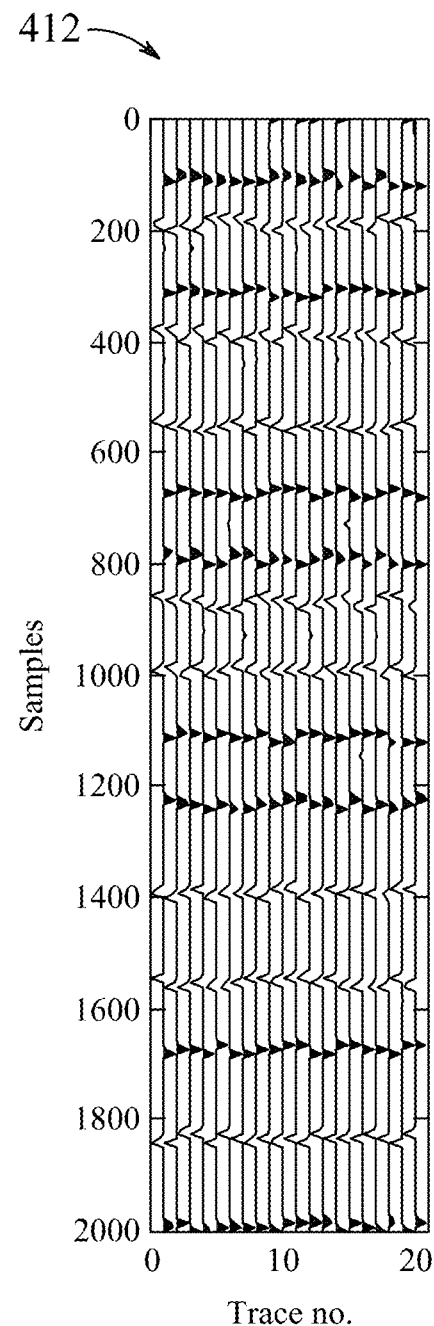
FIG. 4F is an exemplary representation of the deconvolution result with method of the present disclosure in a final iteration during the synthetic simulation, according to certain embodiments.

FIG. 4F is an exemplary representation 412 of the deconvolution result with the method of the present disclosure or the system 100 in a final iteration during the synthetic simulation.

The neural network based autoencoder 130 is configured to generate an estimated reflectivity series using different algorithms. As shown in FIG. 4E-FIG. 4F, the system and methods of the present disclosure comparatively yield the most accurate result with the least noise, which is the most desirable for interpretation. In an example, power spectrum density (PSD) is used to evaluate the quality of the system 100 or the method of the present disclosure. The PSD is a measure of the power content versus frequency of the signal. The amplitude of the PSD is normalized by a spectral resolution employed to digitize the signal.

Among the three techniques (the method of the present disclosure, the BP method, and SD method), the method of the present disclosure provides a definite power spectrum density (PSD), which is close to the true PSD of reflectivity series. The first iteration and the last iteration of the method of the present disclosure are shown in FIG. 4E-FIG. 4F.

Figure 5:
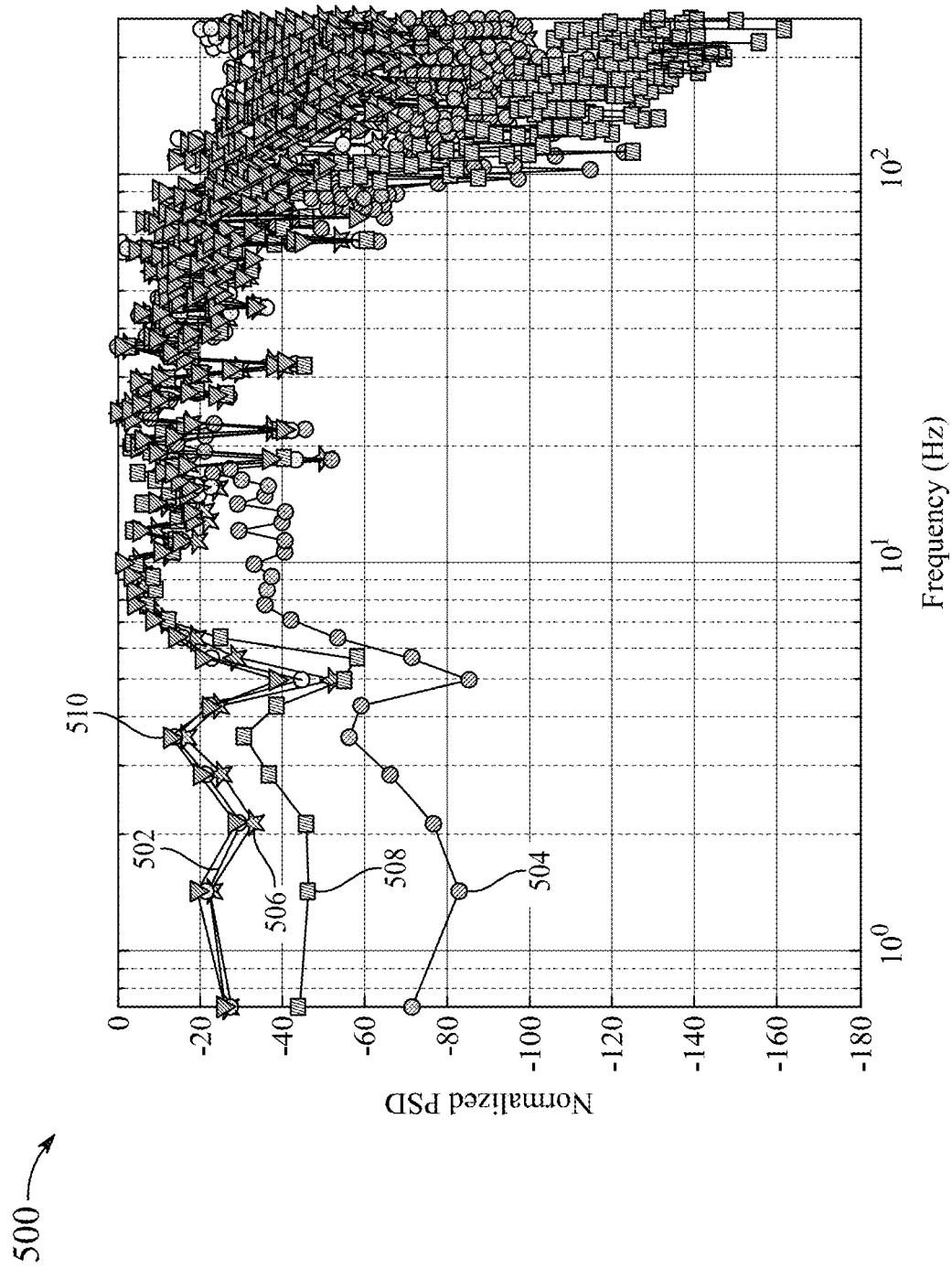
FIG. 5 is an exemplary representation of normalized power spectrum density (PSD) versus frequency, according to certain embodiments.

FIG. 5 is an exemplary representation 500 of the normalized PSD of the original seismic traces, original reflectivity series, and estimated reflectivity series using the BP method, the SD method and the method as disclosed in the present disclosure. Signal 502 represents a normalized PSD of the original reflectivity series. Signal 504 represents a normalized PSD of the original seismic traces. Signal 506 represents a normalized PSD of the reflectivity series using the BP method. Signal 508 represents a normalized PSD of the reflectivity series using the SD method. Signal 510 represents a normalized PSD of the reflectivity series using the method of the present disclosure.

FIG. 6A-FIG. 6B illustrate a frequency-domain view of the wavelet recovery process (Q=0.8 Y) using the method of the present disclosure.

FIG. 6A is an exemplary frequency-domain view 600 of the wavelet recovery process during the first iteration of the method of the present disclosure. Signal 602 represents the recovered seismic wavelet during the first iteration of the method of the present disclosure. FIG. 6B is an exemplary frequency-domain view 650 of the wavelet recovery process during the final iteration. Signal 652 represents the recovered seismic wavelet (estimated wavelet) during the final iteration. Signal 654 represents the original seismic wavelet.

Figure 7:
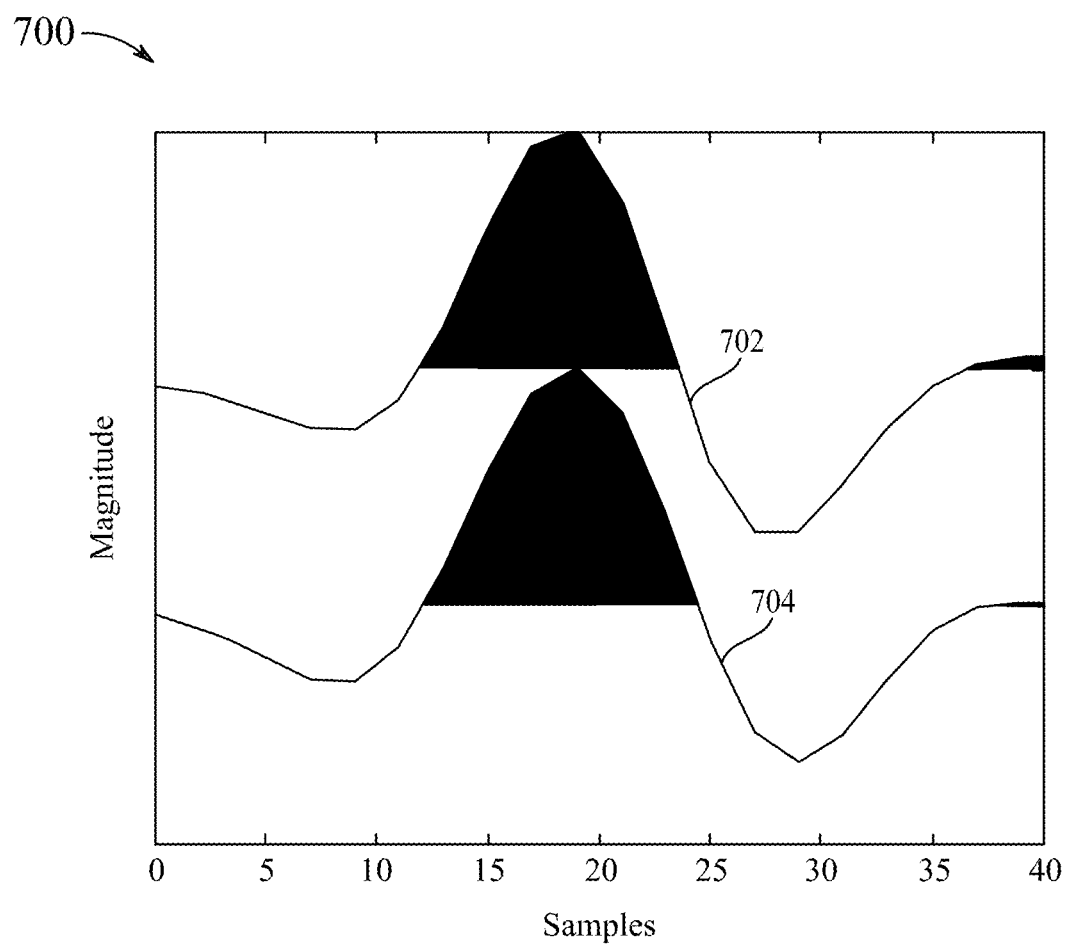
FIG. 7 is an exemplary representation of recovered seismic wavelets versus true seismic wavelets, according to certain embodiments.

FIG. 7 is an exemplary representation 700 of the recovered seismic wavelets versus true seismic wavelets. Signal 702 represents the estimated seismic wavelet provided by the method of the present disclosure. Signal 704 represents the original seismic wavelet.

The intermediate iteration, with the recovery of the seismic wavelet, is shown in FIG. 6A, FIG. 6B, and FIG. 7. The final iteration is presented in frequency domain, which is matched with the original seismic wavelet. In an example, upon obtaining the time-domain seismic wavelet, a chunk of it (for example, having 51 samples and designated as a window) is used to refine the reflectivity in the BD algorithm's final iteration.

To compare the performance of the method of the present disclosure with the SD method and the BD method, two figures of merit are used: relative reconstruction error (RRE) and signal-to reconstruction error ratio (SRER). These figures are defined by:

$$RRE = \frac{(r-\hat{r})^T(r-\hat{r})}{\hat{r}^T r} \text{ and} \qquad (20)$$

$$SRER = 10\log_{10}\frac{\|r\|_2^2}{\|r-\hat{r}\|_2^2} \qquad (21)$$

where r represents the received signal and r̂ represents the estimation of the received signal.

Usually, digital image-matching methods fall into three general categories: area-based method, feature-based method, and hybrid methods. In the present disclosure, an area-based method that is normalized cross-correlation (NCC) approach is employed. In the NCC approach, a statistical comparison is computed from digital numbers taken from same-size subarrays in a left image and a right image. The correlation coefficient can range from −1 to +1, with +1 indicating perfect correlation (exact match). A coefficient of −1 indicates negative correlation. A coefficient value near 0 indicates a non-match and could result from comparison of any two sets of random numbers. In an example, a threshold value, such as 0.8, is chosen and if the correlation coefficient exceeds that value, the subarrays are assumed to match.

Figure 8:
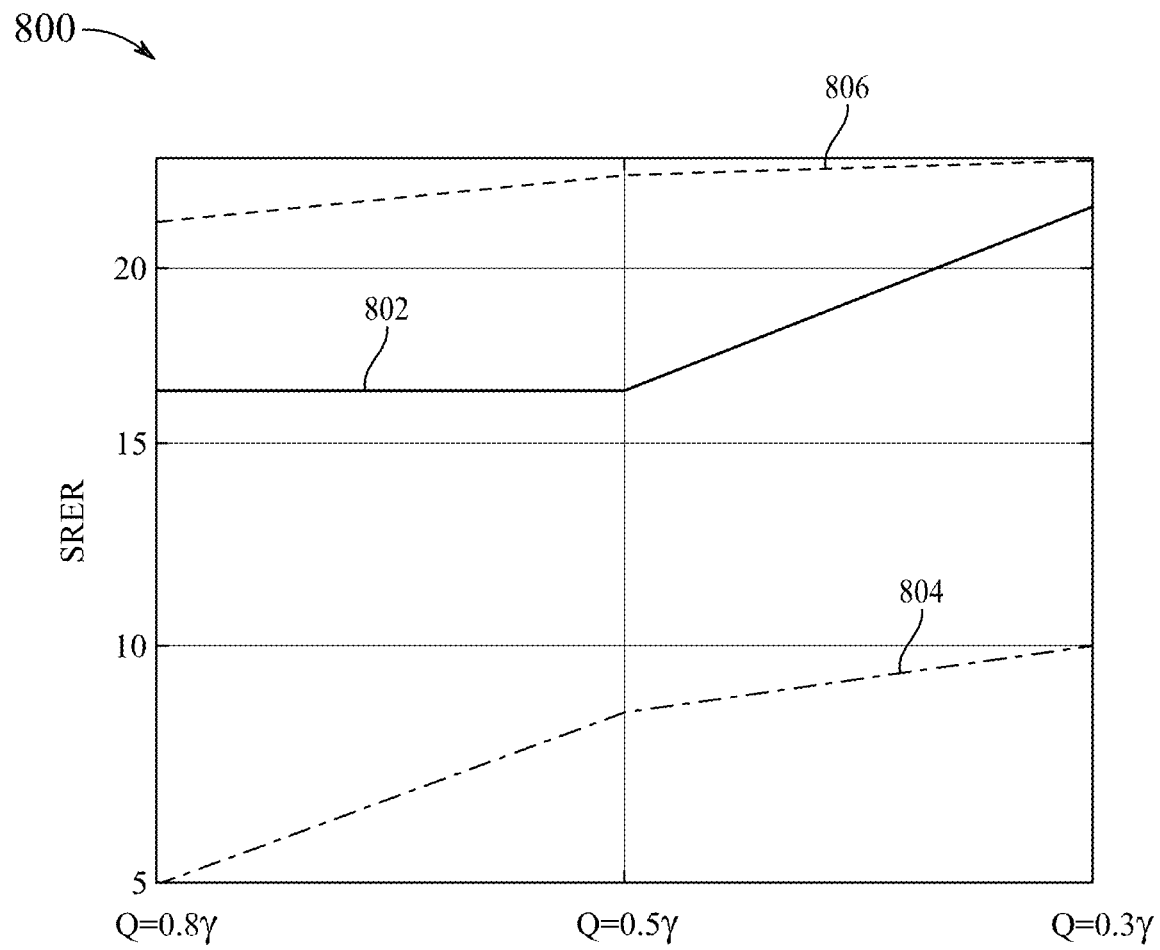
FIG. 8 is an exemplary representation of a normalized correlation coefficient (γ) versus signal-to reconstruction error ratio (SRER) with 20 seismic traces, according to certain embodiments.
Figure 9:
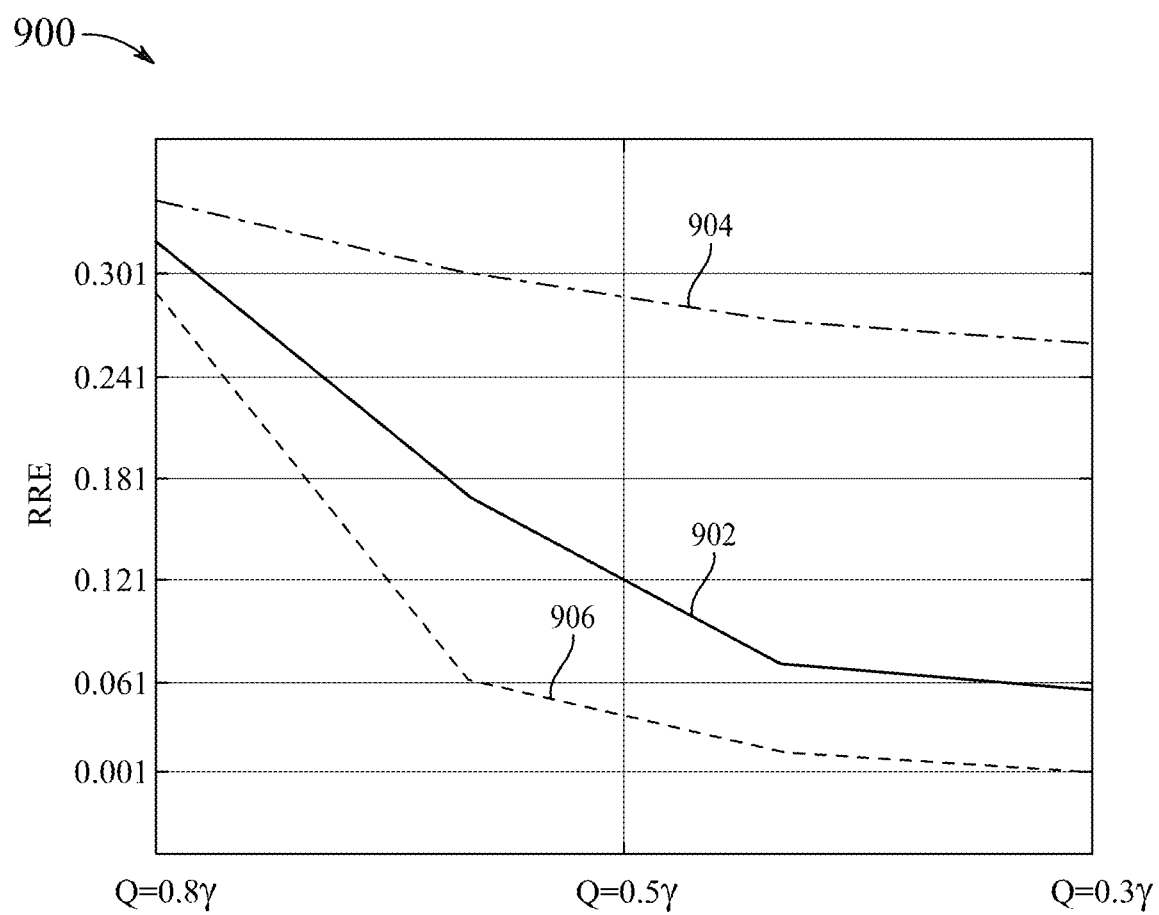
FIG. 9 is an exemplary representation of quality (Q) versus relative reconstruction error (RRE) with 20 seismic traces, according to certain embodiments.

FIG. 8 and FIG. 9 show the parameters SRER and RRE for various signal-to-noise ratio (SNR) levels.

FIG. 8 is an exemplary representation 800 of the normalized correlation coefficient ($\gamma$) versus SRER with 20 seismic traces. In an aspect, the value of normalized correlation coefficient ($\gamma$) varies from 0.8 to 0.3. Signal 802 represents a quantized seismic trace generated by the BP method. Signal 804 represents a quantized seismic trace generated by the SD method. Signal 806 represents a quantized seismic trace generated by the method of the present disclosure.

FIG. 9 is an exemplary representation 900 of the quality of the quantized seismic trace versus RRE with 20 seismic traces. Signal 902 represents quality of the quantized seismic trace generated by the BP method. Signal 904 represents quality of the quantized seismic trace generated by the SD method. Signal 906 represents quality of the quantized seismic trace generated by the method of the present disclosure.

As can be seen from FIG. 8-FIG. 9, the method of the present disclosure outperforms the SD method and BD method in terms of SRER and RRE for all noise levels.

Figure 10:
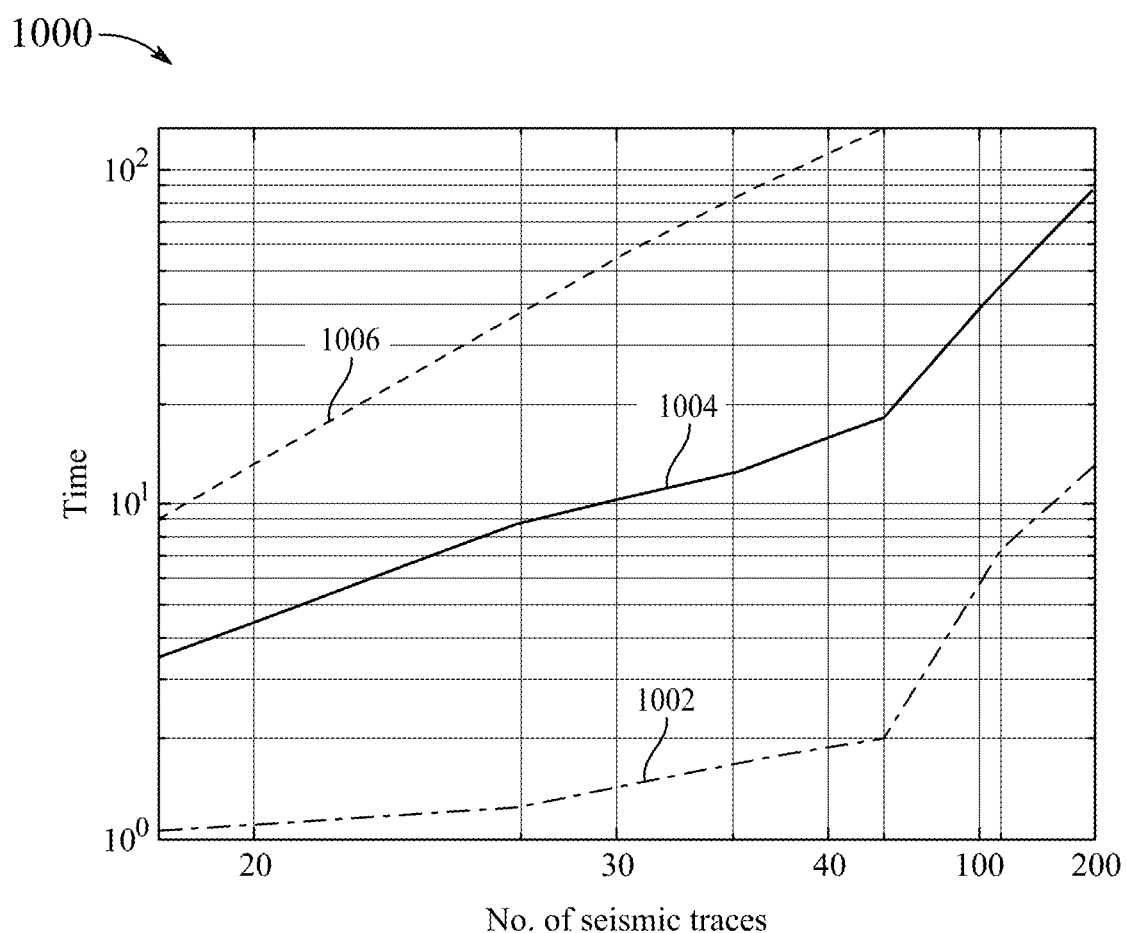
FIG. 10 is an exemplary representation of simulation time versus number of seismic traces, according to certain embodiments.

FIG. 10 is an exemplary representation 1000 of the simulation time versus number of seismic traces. Signal 1002 represents a number of quantized seismic traces generated by the BP method. Signal 1004 represents a number of quantized seismic traces generated by the SD method. Signal 1006 represents a number of quantized seismic traces generated by the method of the present disclosure. For complexity analysis, the simulation time taken by the estimation methods is charted against the count of the seismic traces.

FIG. 8-FIG. 10 are the results of a Monte Carlo simulation performed with 20 different realizations of noise and seismic reflectivity. The Monte Carlo simulation is a mathematical technique that predicts possible outcomes of an uncertain event. Computer programs use this method to analyze past data and predict a range of future outcomes based on a choice of action. The BP method takes much less time, as depicted in FIG. 10. When 200 seismic traces are simulated, the BP method's computation takes approximately 12% of the time needed for the SD method. In addition, for a simulation with 200 traces, the SD method requires a prohibitively large amount of memory 124, therefore the SD method fails to run on the same computing device 120. The computation time of the method of the present disclosure is a bit high due to the training phase. However, in the method of the present disclosure, the number of parameters is very limited.

Second Experiment: Determining the performance of the present system, the basis pursuit (BP) method, and the steepest decent (SD) method with field seismic data.

During the first experiment (field simulation), the SD method, BD method, and the method of the present disclosure are applied on a field seismic data set (practical scenario), and the results are presented in FIG. 11-FIG. 14. The field seismic data set was obtained from the Line ID 51-101, Legacy Data Archive by USGS (1976), National Petroleum Reserve, Alaska (NPRA).

For the field seismic data set, the SD method was run in a window having a duration of 0.35 s with the total number of seismic traces set as 150. For the SD method, the deconvolution filter size was fixed to 21 samples, and a point was marked at the filter's center for the purpose of initialization. Furthermore, the step size for the SD method was set to =0.1. For the BP method, the window size was the same as in the SD method. The deconvolution filter used for the SD method was estimated for the entire field data set. The remaining parameters of the three techniques were identical to the parameters used in the synthetic data test.

FIG. 11A-FIG. 11E show the deconvolution results for the three algorithms (the SD method, BD method, and the method of the present disclosure) together with the recorded data.

Figure 11A:
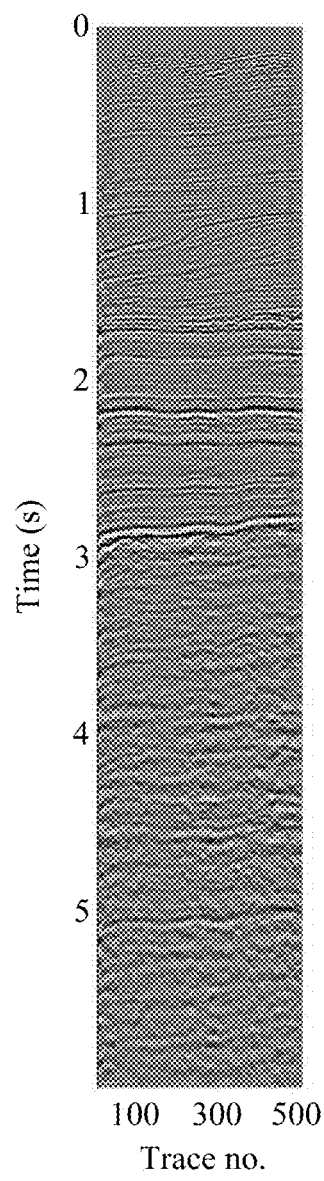
FIG. 11A is an exemplary representation of received data having a window of 6 s and 500 seismic traces during field simulation, according to certain embodiments.
Figure 11B:
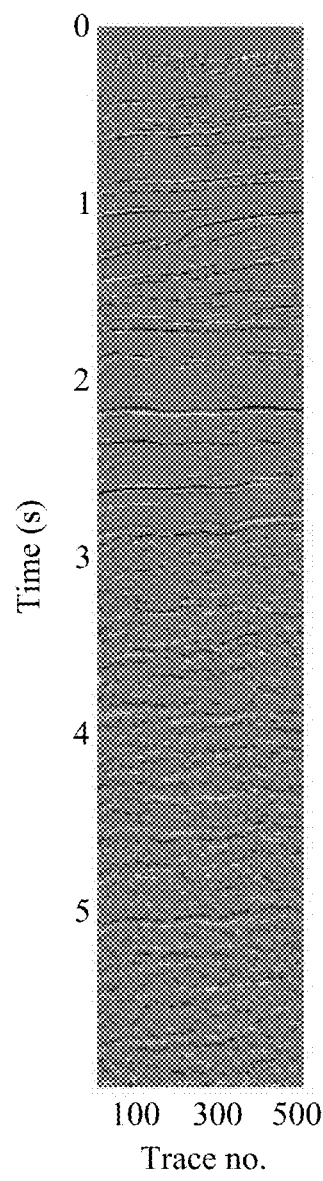
FIG. 11B is an exemplary representation of the deconvolution result with the basis pursuit method during the field simulation, according to certain embodiments.
Figure 11C:
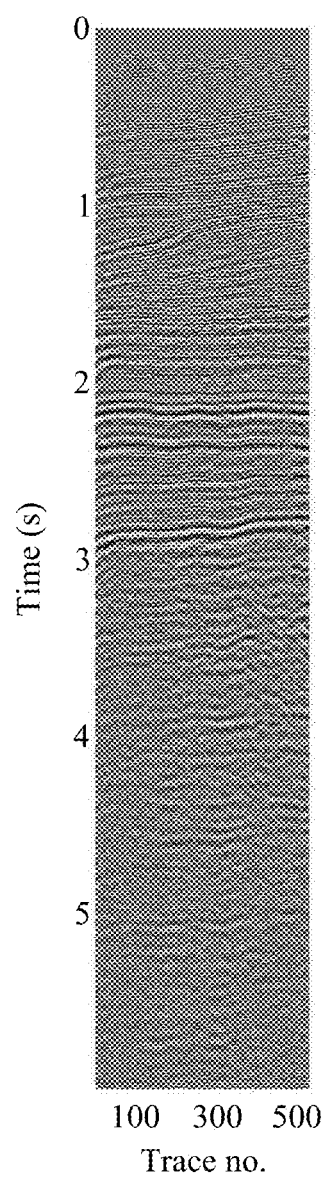
FIG. 11C is an exemplary representation of the deconvolution result with the steepest decent method during the field simulation, according to certain embodiments.
Figure 11D:
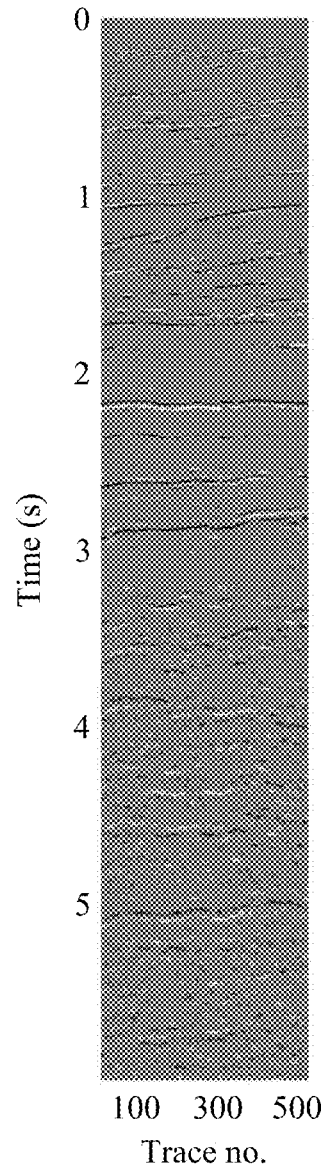
FIG. 11D is an exemplary representation of deconvolution result with the method of the present disclosure in a first iteration during the field simulation, according to certain embodiments.
Figure 11E:
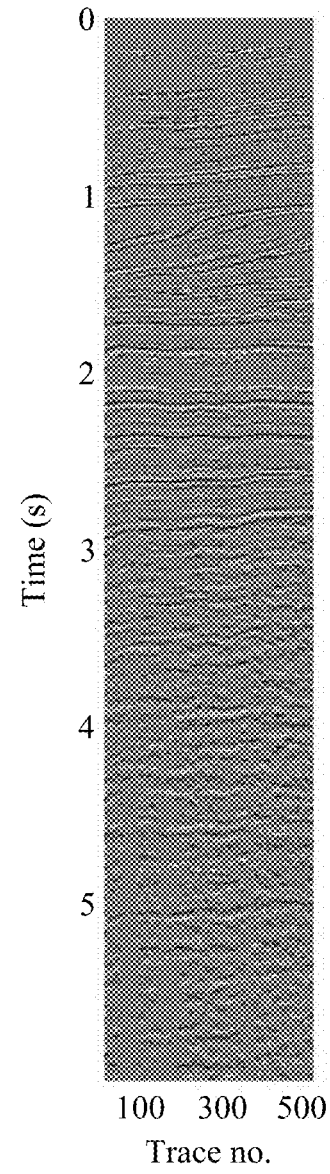
FIG. 11E is an exemplary representation of deconvolution result with the method of the present disclosure in a final iteration during the field simulation, according to certain embodiments.

FIG. 11A is an exemplary representation 1102 of the received data having a window of 6 s and 500 seismic traces during the field simulation. FIG. 11B is an exemplary representation 1104 of the deconvolution result with BP method during the field simulation. FIG. 11C is an exemplary representation 1106 of the deconvolution result with SD method during the field simulation. FIG. 11D is an exemplary representation 1108 of the deconvolution result with the method of the present disclosure in the first iteration during the field simulation. FIG. 11E is an exemplary representation 1110 of the deconvolution result with the method of the present disclosure in the final iteration during field simulation.

Figure 12D:
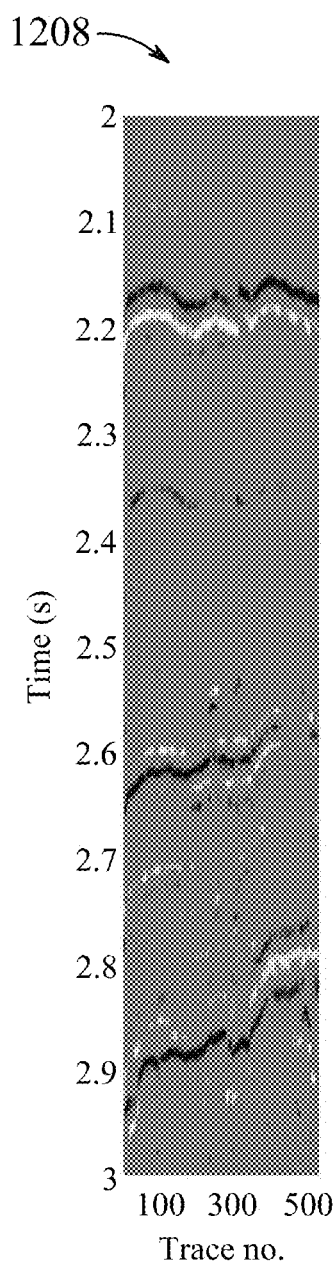
FIG. 12D is another exemplary representation of deconvolution result with the method of the present disclosure in a first iteration during the field simulation, according to certain embodiments.
Figure 12E:
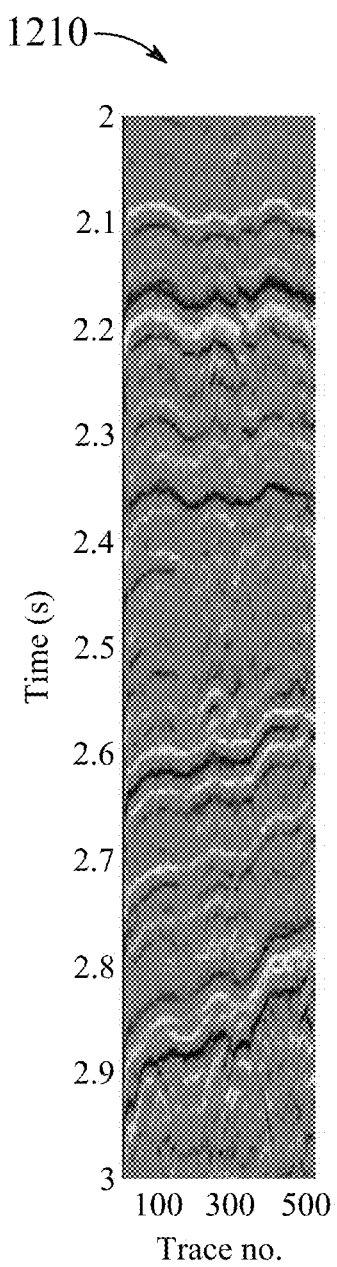
FIG. 12E is another exemplary representation of deconvolution result with the method of the present disclosure in a final iteration during the field simulation, according to certain embodiments.

FIG. 12A-FIG. 12E show the deconvolution results for the three methods (the SD method, BD method, and the method of the present disclosure) together with the recorded data. FIG. 12A-FIG. 12E depict the relevant information of a zoomed-in field data section prior to and after the processing, i.e., deconvolution. FIG. 12A is another exemplary representation 1202 of a subset of received data having a window of 2 s≤t≤3 s and 500 seismic traces during the field simulation. FIG. 12B is another exemplary representation 1204 of the deconvolution result with the BP method during the field simulation. FIG. 12C is another exemplary representation 1206 of the deconvolution result with SD method for synthetic simulation during the field simulation. FIG. 12D is another exemplary representation 1208 of the deconvolution result with the method of the present disclosure in the first iteration during the field simulation. FIG. 12E is another exemplary representation 1210 of the deconvolution result with the method of the present disclosure in the final iteration during the field simulation. From FIG. 12A-FIG. 12E, it is evident that the method of the present disclosure has an improved deconvolution outcome as compared to the other two conventional methods, as shown by these results.

Figure 13:
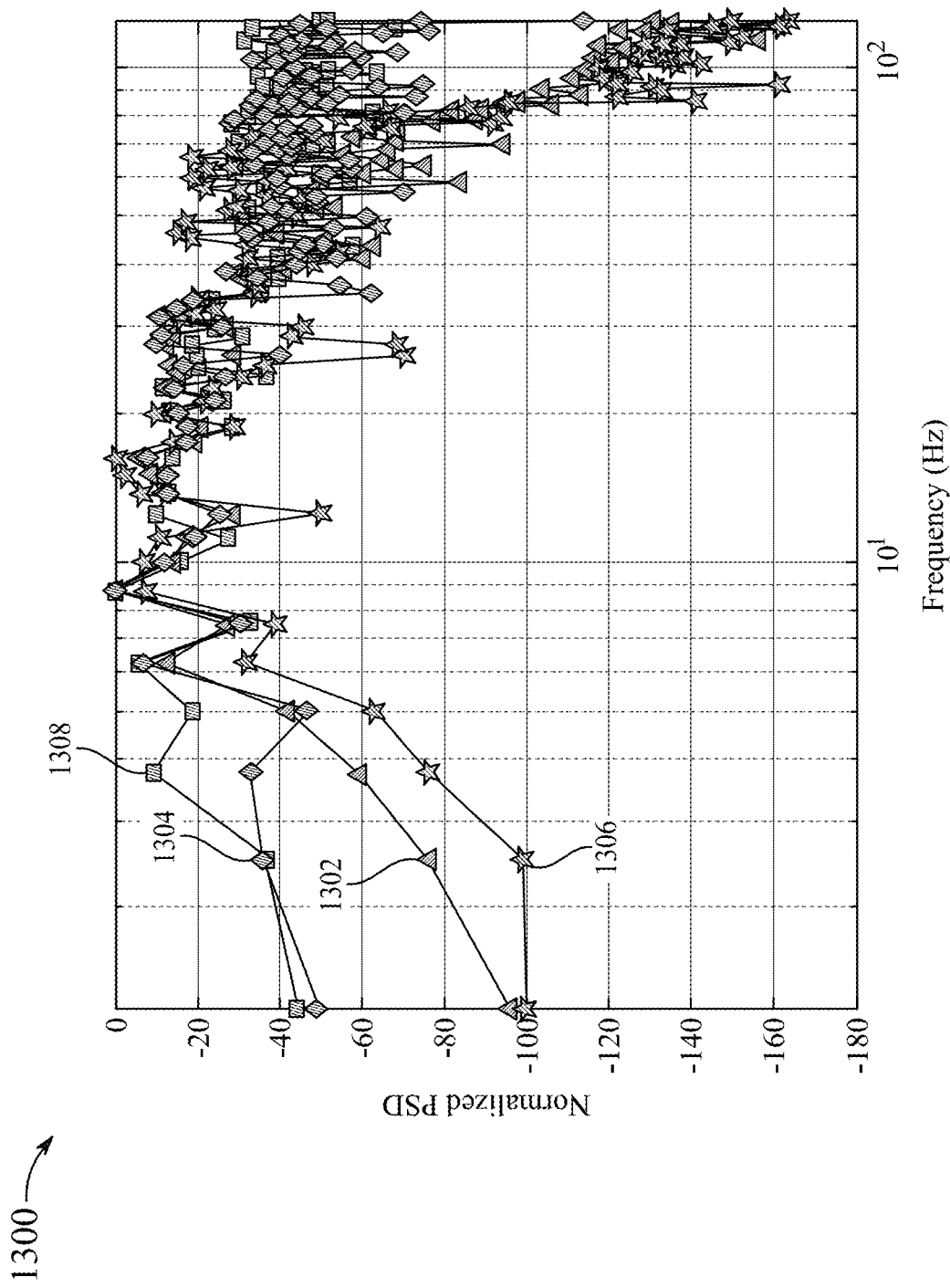
FIG. 13 is an exemplary representation of normalized PSD of the original field traces, original reflectivity, and estimated reflectivity, according to certain embodiments.

FIG. 13 is an exemplary representation 1300 of the normalized PSD of the original field traces, original reflectivity series, and estimated reflectivity series generated by the three methods. Signal 1302 represents a normalized PSD of the original reflectivity series. Signal 1304 represents a normalized PSD of the original seismic traces. Signal 1306 represents a normalized PSD of the reflectivity series using the BP method. Signal 1308 represents a normalized PSD of the reflectivity series using the SD method. Signal 1310 represents a normalized PSD of the reflectivity series using the method of the present disclosure. In terms of the power densities, the SD method provides significant gain in the 40 Hz-70 Hz band, whereas the BD method has a relatively flat normalized PSD. FIG. 11 and FIG. 13 were plotted after applying RMS automatic gain control with a window length of 0.1 s to compensate for the lost amplitude after deconvolution.

FIG. 14A-FIG. 14E show the deconvolution results for the three algorithms (the SD method, BD method, and the method of the present disclosure) with another field data set including a two-dimensional (2D) land line from east Texas, USA, used for a performance comparison. FIG. 14A-FIG. 14E demonstrate the superior performance of the method of the present disclosure in comparison to the other methods.

Figure 14A:
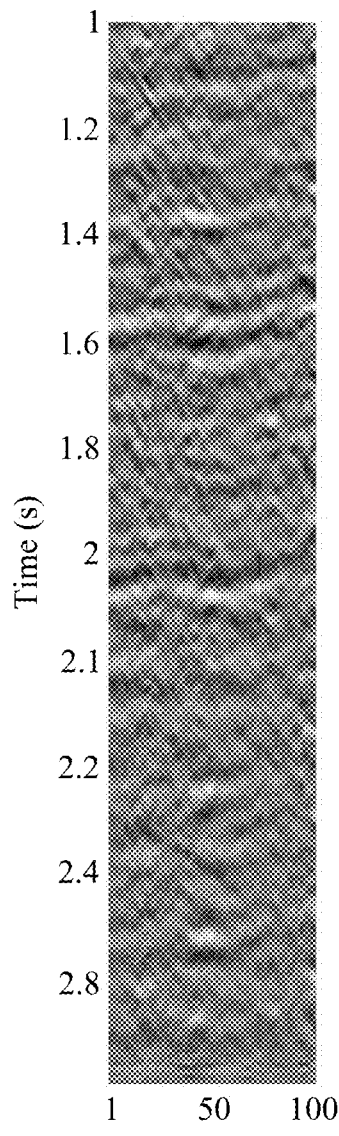
FIG. 14A is an exemplary representation of 100 seismic traces of raw field data set, according to certain embodiments.
Figure 14B:
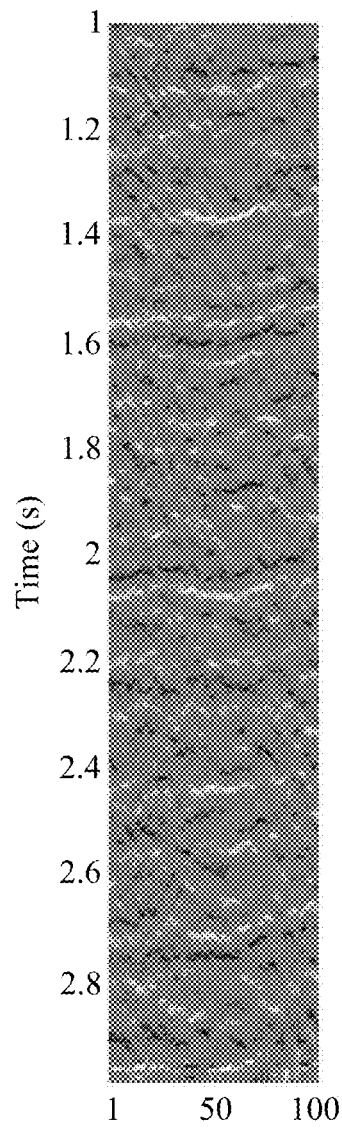
FIG. 14B is an exemplary representation of deconvolution result with the basis pursuit method, according to certain embodiments.

FIG. 14A is an exemplary representation 1402 of 100 seismic traces of the raw field data set. FIG. 14B is an exemplary representation 1404 of the deconvolution result with the BP method. The BP method is implemented in the following three steps:

1. Initial peak detection for each channel. For the j-th trace, an initial reflectivity $r_j^0$ is given as:

$$r_j^0 = \operatorname*{argmin}_{r_j}(\bar{x}_j^T r_j - 1)^2 \text{ subject to } \|r_j\|_1 = \tau, \quad (22)$$

where $\bar{x}_j$ is the j-th received trace normalized by its maximal absolute value.

2. Wavelet estimation.

The assumption that the wavelet is identical for all the channels is now exploited. A seismic source is usually band-limited in reality, so the sparsity of the wavelet in the frequency domain is a reasonable assumption. The Fourier transform of the seismic trace, $x_j[n]$ of equation 1 is given as:

$$X_j(e^{jw}) = R_j(e^{jw})W_j(e^{jw}) + Z_j(e^{jw}), \quad (23)$$

would be sampled in the frequency domain with a DFT, represented by $\mathcal{F}\{\cdot\}$, in order to create length—$N_{DFT}$ vectors $W_j$, $R_j$ and $X_j$. After replacing $R_j$ with the DFT of the initial estimate of reflectivity, $R_j^0 = \mathcal{F}\{r_j^0\}R_j^0$, the following minimization problem can be solved for the estimated wavelet in each channel:

$$\tilde{W}_j = \operatorname{argmin}\|W_j\|_1 \text{ subject to } \|X_j - \operatorname{diag}(R_j^0)W_j\|_2 \le \|Z_j\|_2, \quad (24)$$

where diag $(R_j^0)$ is a diagonal matrix with entries from the vector $R_j^0$. Once an estimate of the wavelet is obtained for each channel, stacking is used to improve the SNR of the common wavelet estimate. The stacking process is carried out using $\tilde{W}_j$ over all channels to obtain a single estimated wavelet $\tilde{w}$ in the time domain:

$$\tilde{w} = \Re\left[\mathcal{F}^{-1}\left\{\sum_{i=1}^{J} \tilde{W}_j\right\}\right], \quad (25)$$

where $\Re$ represents the real part.

3. Refining the estimate of the reflectivity model. The following basis pursuit denoising problem is solved in order to estimate a sparse reflectivity series:

$$\hat{r}_j = \operatorname{argmin}\|r_j\|_1 \text{ subject to } \|x_j - Cr_j\|_2 \le \|z_j\|_2, \quad (26)$$

where C represents the convolution matrix having entries related to $\tilde{w}$ and $x_j = [x_j[1], \ldots, x_j[N]]^T$.

In the BP method, several parameters require attention. First, $\tau$ in equation (22) is the parameter that controls the number of peaks (i.e., sparsity) in the initial estimate of the per channel reflectivity. Let $\tau=1$, the solution from equation (22) is a trivial solution that pinpoints only one peak at the highest value of $x_j[n]$. On the other hand, if $\tau$ is too large, the per channel estimate of the reflectivity is not sparse. Empirically, a value of 1.6 works well over a wide range of SNR for both synthetic and field data.

Figure 14C:
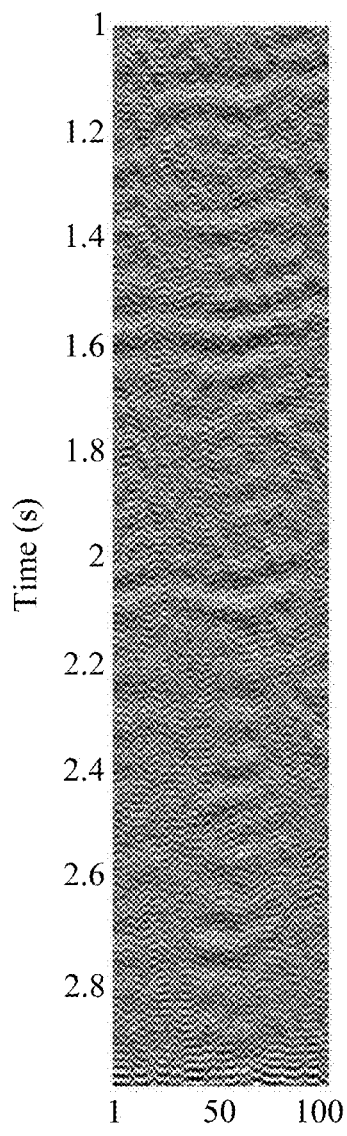
FIG. 14C is an exemplary representation of the deconvolution result with the steepest decent method for synthetic simulation, according to certain embodiments.
Figure 14D:
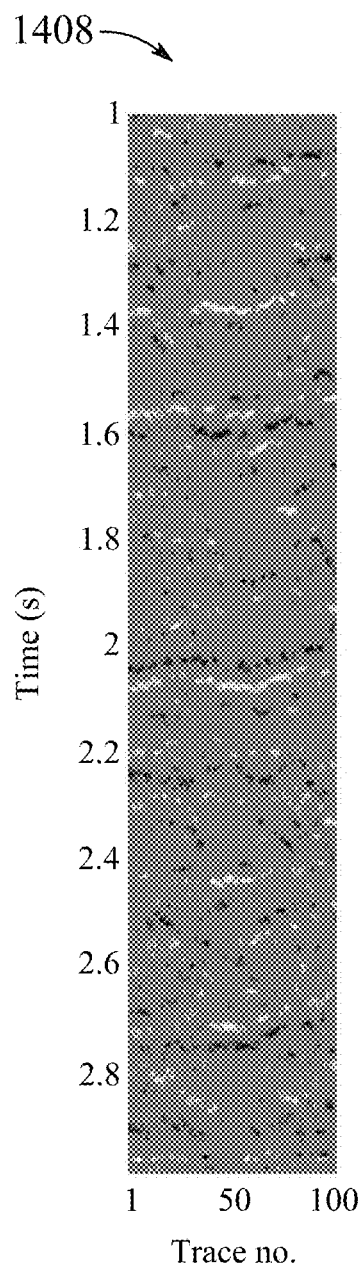
FIG. 14D is an exemplary representation of the deconvolution result with the method of the present disclosure in a first iteration, according to certain embodiments.
Figure 14E:
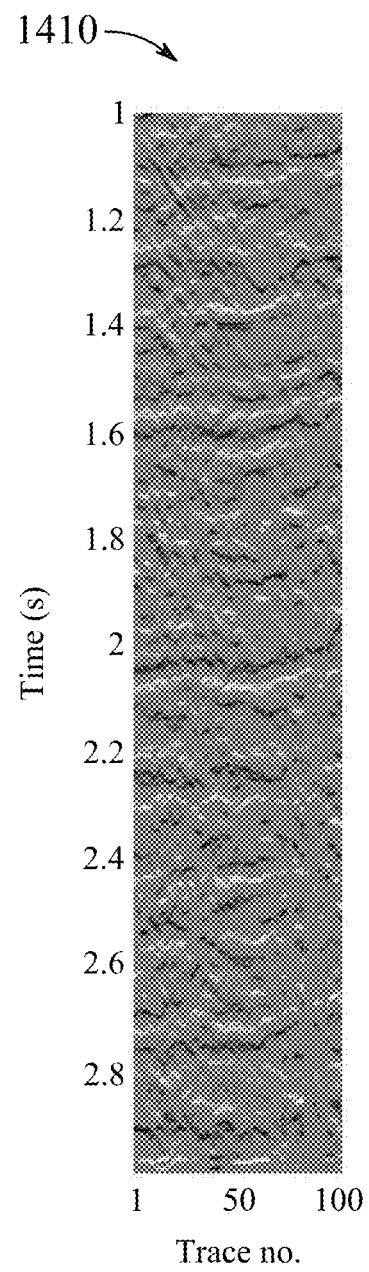
FIG. 14E is an exemplary representation of the deconvolution result with the method of the present disclosure in a final iteration, according to certain embodiments.

FIG. 14C is an exemplary representation 1406 of the deconvolution result with the SD method for synthetic simulation. FIG. 14D is an exemplary representation 1408 of the deconvolution result using the methods of the present disclosure in the first iteration. FIG. 14E is another exemplary representation 1410 of the deconvolution result with the methods of the present disclosure in the final iteration.

The method of the present disclosure addresses the issue of recovering sparse reflectivity sequences from the randomly quantized seismic data and then includes a robust reconstruction approach based on a neural network (Neural network based autoencoder 130). The method of the present disclosure is helpful for compressing massive amounts of seismic data. In experiments with the synthetic data set, and the field data set, the method of the present disclosure significantly improves the robustness of the solution towards a change in the quantization error and thus enhances the visual saliency of properly recovered reflectivity series (impulses) compared with conventional methods. During a training phase, only a small number of fundamental signals are chosen in order to reduce the time. In the experiments with the synthetic data, since the true reflectivity series is known, the quality of the recovery is easy to evaluate. The method of the present disclosure is effective and robust against the quantization noise, i.e., for a wide range of SNR. The method of the present disclosure outperforms the BD and SD methods in terms of relative reconstruction error and signal-to-reconstruction error ratio. The above was achieved at the expense of the computation time which is a bit high due to the training phase. In the method of the present disclosure, the number of parameters to tweak are very limited, therefore making the method of the present disclosure simple to implement in real-world applications.

The recovered signal is used for a fault in the geologic structure, an oil layer in oil prospecting, a layer of water. These signals undergo through various processes like stacking and migration and results in a seismic image. This image is used to find the oil reserves.

In the field of seismic exploration, stacking and migration are two fundamental processes used in seismic data processing to enhance the quality and interpretability of seismic images.

Stacking: Stacking, also known as seismic trace summation, is a technique used to improve the signal-to-noise ratio and enhance the coherent features in seismic data. It involves combining multiple seismic traces acquired at different receiver locations and/or with different source-receiver offsets.

During the acquisition process, seismic waves generated by controlled sources propagate through the subsurface and are recorded by geophones or other sensors. Each recorded trace corresponds to the response of the subsurface at a specific receiver location. Stacking involves summing or averaging the seismic traces to create a single trace that represents the average response of the subsurface at that location.

By combining multiple traces, stacking helps to reduce random noise and enhance the desired signal, making it easier to identify subsurface reflections and other seismic events. Stacking is particularly effective in increasing the signal-to-noise ratio for seismic data that suffer from low-quality or low-amplitude signals.

Migration: Migration is a process used to create accurate images of the subsurface by correctly positioning seismic events in their true spatial locations. It aims to overcome the limitations imposed by the linear approximation of seismic data acquisition and reconstruct the subsurface reflectors more accurately.

During seismic data acquisition, recorded traces are typically collected along straight lines or in a regular grid pattern. However, the subsurface structures are often complex and curved. Migration algorithms mathematically reposition seismic events, accounting for the actual subsurface geometry and the wave propagation effects, to obtain a more accurate representation of the subsurface structure.

Migration techniques can be classified into two main categories: time migration and depth migration. Time migration algorithms work directly on the recorded seismic data in the time domain and aim to determine the two-way travel time of reflected waves. Depth migration algorithms, on the other hand, attempt to estimate the true depth of subsurface reflectors and provide more accurate imaging in complex geological settings.

By applying migration, seismic images become more accurately positioned in space, allowing geoscientists to interpret subsurface structures, locate potential hydrocarbon reservoirs, and make informed decisions in oil and gas exploration or other geophysical investigations.

Both stacking and migration are crucial steps in seismic data processing, helping to improve the quality, resolution, and interpretability of seismic images, and enabling better understanding of subsurface geology.

Seismic images, generated through the processing and interpretation of seismic data, are vital in various applications within the field of geophysics and oil and gas exploration. Here are some of the key uses of seismic images:

I. Hydrocarbon Exploration: Seismic images are extensively used in the search for oil and gas reservoirs. By providing detailed subsurface information, seismic images assist in identifying potential hydrocarbon-bearing structures, estimating their size and shape, and determining their geological properties. This information aids in making informed decisions regarding drilling locations and optimizing exploration efforts.

II. Reservoir Characterization: Seismic images help geoscientists characterize reservoirs in terms of their geometry, fluid content, porosity, permeability, and rock properties. By analyzing seismic reflections and amplitudes, they can infer lithology variations, identify faults, fractures, and stratigraphic features, and estimate the distribution of reservoir fluids. Such insights are essential for reservoir modeling, production planning, and maximizing hydrocarbon recovery.

III. Well Planning and Targeting: Seismic images play a crucial role in well planning and target selection. By integrating seismic data with well logs and other geological information, geoscientists can identify optimal locations for drilling wells. Seismic images provide insights into subsurface structures, stratigraphy, and potential reservoir traps, helping to minimize drilling risks and increase the chances of successful drilling outcomes.

IV. Geohazard Assessment: Seismic images are valuable for assessing geohazards such as earthquakes, landslides, and subsidence. By analyzing subsurface structures and faults, geoscientists can identify areas prone to seismic activity or instability. This information aids in designing infrastructure, such as buildings, pipelines, and dams, in regions with potential geohazard risks.

V. Geological Mapping: Seismic images contribute to detailed geological mapping and understanding of subsurface geology. By interpreting seismic reflections and relationships between different rock layers, geoscientists can map geological formations, structural features, and stratigraphic sequences. This knowledge is crucial for regional geological studies, basin analysis, and geological mapping projects.

VI. Environmental Studies: Seismic images are utilized in environmental studies to assess the impact of human activities or natural processes on the subsurface. They aid in evaluating groundwater resources, identifying potential contamination pathways, studying the effects of mining activities, and monitoring geothermal systems.

Overall, seismic images are essential tools for geoscientists and geophysicists, providing valuable insights into the subsurface and supporting decision making processes in various fields, including hydrocarbon exploration, reservoir characterization, well planning, geohazard assessment, geological mapping, and environmental studies.

Lastly, the unit is in volts and the threshold value depends on the trace (data driven).

The first embodiment is illustrated with respect to FIG. 1-FIG. 3. The first embodiment describes the method for performing a seismic survey of a geological formation. The method includes generating, with a seismic transducer 102 located at a surface of the geological formation, a seismic source wavelet within the geological formation. The method includes receiving, by an array of seismic sensors located at a surface of the geological formation, the seismic source wavelet convolved with seismic waves reflected from the geological formation plus noise and generating, by the array of seismic sensors, seismic traces by transducing the seismic source wavelet convolved with the seismic waves reflected from the geological formation plus the noise into electrical signals. The method includes transmitting, by each seismic sensor 104 of the array of seismic sensors 104, the seismic traces. The method includes receiving, by a receiver 108, the seismic traces from each seismic sensor of the array of seismic sensors 104. The method includes generating, by the receiver 108, a set of seismic time-series traces. The method includes recording, in a memory 124 of a computing device 120 connected to the receiver, the set of seismic time-series traces. The method includes compressing, by the computing device 120, the set of seismic time series traces by quantizing a randomly selected subset of samples of the set of seismic time-series traces. The method includes deconvolving, by a trained long short-term memory (LSTM) neural network based autoencoder 130 connected to the computing device 120, the randomly selected subset of samples. The method includes generating, by the trained LSTM neural network based autoencoder 130, a deconvolved randomly selected subset of samples. The method includes reconstructing, by the computing device 120, the seismic waves reflected from the geological formation from the deconvolved randomly selected subset of samples.

In an aspect, the method includes training the long short-term memory (LSTM) neural network based autoencoder 130 on a field seismic data set.

In an aspect, the method includes randomly selecting less than 20 samples of each seismic time-series trace.

In an aspect, the method includes randomly selecting less than 30 samples of each seismic time-series trace.

In an aspect, the deconvolving, by the trained LSTM neural network based autoencoder 130, removes the seismic source wavelet and the noise from each seismic time-series trace of the randomly selected subset of samples.

In an aspect, the quantizing the randomly selected subset of samples further includes storing N binary bits of each sample of the randomly selected subset, determining a maximum value Y of each sample, selecting a scaling factor greater than zero and less than or equal to one, and determining a quantization interval q by multiplying the scaling factor by the maximum value Y.

In an aspect, the selecting the scaling factor from one of the following: the scaling factor is 0.2 and the quantization interval q is 0.2Y, the scaling factor is 0.3 and the quantization interval q is 0.3Y, the scaling factor is 0.6 and the quantization interval q is 0.6Y, and the scaling factor is 0.8 and the quantization interval q is 0.8Y.

In an aspect, the method includes calculating, by the computing device 120, a compression gain $C_r$ given by multiplying the N binary bits by a ratio of a base 2 log of q divided by a base 2 log of 2Y.

In an aspect, the method includes upper bounding the compression gain by limiting an absolute value of a quantization error to be less than one half of the quantization interval q.

In an aspect, the method includes comparing an amplitude of each reconstructed trace to a threshold value and identifying spikiness when the magnitude exceeds the threshold value.

In an aspect, the method includes displaying, on a computer screen of the computing device 120, the reconstructed seismic waves reflected from the geological formation. The method includes identifying spikiness within a reconstructed trace of the reconstructed seismic waves reflected from the geological formation. The method includes identifying at least one layer of the geological formation from the identified spikiness.

In an aspect, the method includes displaying, on a computer screen of the computing device 120, the reconstructed seismic waves reflected from the geological formation. The method includes identifying spikiness within a reconstructed trace of the reconstructed seismic waves reflected from the geological formation. The method includes identifying at least one fault in the geological formation from the identified spikiness.

The second embodiment is illustrated with respect to FIG. 1-FIG. 3. The second embodiment describes the system 100 for performing a seismic survey of a geological formation. The system 100 includes a seismic transducer 102, an array of seismic sensors 104, a transmitter 106, a receiver 108, a computing device 120, a quantizer 128, a trained long short-term memory (LSTM) neural network based autoencoder 130, and a computer screen 140. The seismic transducer 102 is located at a surface of the geological formation. The seismic transducer 102 is configured to generate a seismic source wavelet within the geological formation. The array of seismic sensors 104 is located at a surface of the geological formation. The array of seismic sensors 104 is configured to generate seismic traces. The seismic traces include the seismic source wavelet convolved with seismic waves reflected from the geological formation plus noise. The transmitter is operatively connected to each of the seismic sensors 104 of the array of seismic sensors 104. The transmitter 106 is configured to wirelessly transmit the seismic traces. The receiver 108 is configured to receive the seismic traces and generate a set of seismic time-series traces. The computing device 120 includes electrical circuitry 122, a memory 124 storing program instructions, and a processor 126 configured to execute the program instructions. The quantizer 128 is operatively connected to the processor 126. The quantizer 128 is configured to compress the set of seismic time series traces by randomly selecting a subset of samples of the set of seismic time-series traces. The trained long short-term memory (LSTM) neural network based autoencoder 130 is operatively connected to the processor 126. The trained LSTM neural network based autoencoder 130 is configured to deconvolve the randomly selected subset of samples and generate a deconvolved randomly selected subset of samples. The computer screen is operatively connected to the computing device 120. The computing device 120 is configured to reconstruct the seismic waves reflected from the geological formation from the deconvolved randomly selected subset of samples and render the reconstructed seismic waves reflected from the geological formation on the computer screen.

In an aspect, the system 100 includes a comparator 132 configured to compare a magnitude of the reconstructed seismic waves reflected from the geological formation to a threshold value and identify spikiness in the magnitude when the magnitude is greater than or equal to the threshold value.

In an aspect, the system includes a database 134 configured to store records which relate patterns of spikiness to structures in the geological formation. The computing device 120 is configured to determine a pattern of the spikiness and compare the pattern of spikiness to a record within the database to identify at least one structure of the geological formation.

In an aspect, the computing device 120 is further configured to identify the pattern as one of a fault, a layer, a changed composition of a layer, an oil layer, a sand layer and a rock layer.

In an aspect, the computing device 120 is configured to randomly select less than 20 samples of each seismic time-series trace.

In an aspect, the quantizer 128 is configured to: store N binary bits of each sample of the randomly selected subset, determine a maximum value Y of each sample, select a scaling factor greater than zero and less than or equal to one, and determine a quantization interval q by multiplying the scaling factor by the maximum value Y.

The third embodiment is illustrated with respect to FIG. 1-FIG. 3. The third embodiment describes a method for performing a seismic survey of a volume of a below ground substrate. The method includes selecting an array of seismic sensors 104 for performing the seismic survey. The method includes installing the array of seismic sensors 104 on a ground surface above the volume of a below ground substrate in a pattern configured to detect reflected seismic waves from areas of interest within the volume. The method includes generating, with a seismic transducer 102, a seismic source wavelet within the volume. The method includes receiving, by the array of seismic sensors 104 located at a surface of the geological formation, the seismic source wavelet convolved with seismic waves reflected from the geological formation plus noise and generating, by the array of seismic sensors 104, seismic traces by transducing the seismic source wavelet convolved with the seismic waves reflected from the geological formation plus the noise into electrical signals. The method includes transmitting, by each one of the array of seismic sensors 104, the seismic traces. The method includes receiving, by a receiver 108, the seismic traces from each one of the array of seismic sensors 104. The method includes generating, by the receiver 108, a set of seismic time-series traces. The method includes recording, in a memory 124 of a computing device 120 connected to the receiver, the set of seismic time-series traces. The method includes compressing, by the computing device 120, the set of seismic time series traces by quantizing a randomly selected subset of samples of the set of seismic time-series traces. The method includes deconvolving, by a trained long short-term memory (LSTM) neural network based autoencoder 130 connected to the computing device 120, the randomly selected subset of samples, wherein deconvolving comprises removing the seismic source wavelet and the noise from each seismic time-series trace of the randomly selected subset of samples. The method includes generating, by the trained LSTM neural network based autoencoder 130, a deconvolved randomly selected subset of samples. The method includes reconstructing, by the computing device 120, the reflected seismic traces from the deconvolved randomly selected subset of samples. The method includes comparing, by the computing device 120, an amplitude of each reflected seismic trace to a threshold value and identifying spikiness when the magnitude exceeds the threshold value. The method includes determining, by the computing device 120, a pattern of the spikiness. The method includes comparing, by the computing device 120, the pattern of the spikiness to a database storing records which relate patterns of spikiness to structures in the volume. The method includes displaying, on a computer screen of the computing device 120, the reflected seismic traces with the identification of the structures in the volume.

In an aspect, the method includes randomly selecting less than 20 samples of each seismic time-series trace.

Next, further details of the hardware description of the computing environment of FIG. 1 according to exemplary embodiments is described with reference to FIG. 15.

Figure 15:
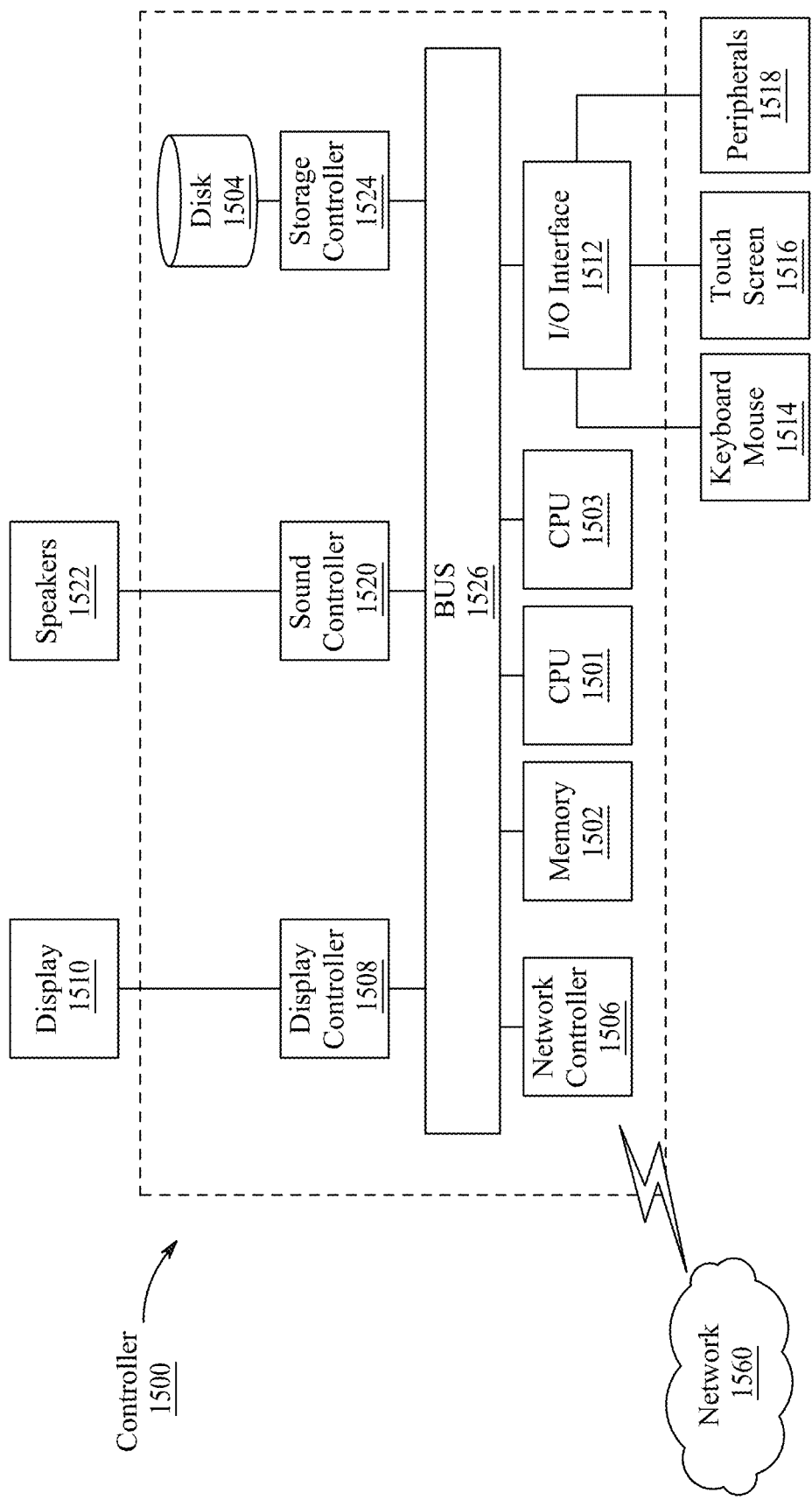
FIG. 15 is an illustration of a non-limiting example of details of computing hardware used in the system, according to certain embodiments.

In FIG. 15, a controller 1500 is described as representative of the system 100 for performing the seismic survey of the geological formation of FIG. 1 in which the computing device 120 is a computing device 120 which includes a CPU 1501 which performs the processes described above/below. FIG. 15 is an illustration of a non-limiting example of details of computing hardware used in the computing system, according to exemplary aspects of the present disclosure. In FIG. 15, a controller 1500 is described which is a computing device 120 (that includes processor 126) and includes a CPU 1501 which performs the processes described above/below. The process data and instructions may be stored in memory 1502. These processes and instructions may also be stored on a storage medium disk 1504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1501, 1503 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1501 or CPU 1503 may be a Xenon or Core processor from Intel of America or an Opteron processor from AMD of America, or may be other processor types that would be recognized by one of ordinary skill in the art. Alternatively, the CPU 1501, 1503 may be implemented on an FPGA, ASIC, PLD or using discrete logic circuits, as one of the ordinary skill in the art would recognize. Further, CPU 1501, 1503 may be implemented as multiple processors cooperatively working in parallel to perform the instructions of the inventive processes described above.

The computing device in FIG. 15 also includes a network controller 1506, such as an Intel Ethernet PRO network interface card from Intel Corporation of America, for interfacing with network 1560. As can be appreciated, the network 1560 can be a public network, such as the Internet, or a private network such as an LAN or WAN network, or any combination thereof and can also include PSTN or ISDN sub-networks. The network 1560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1508, such as a NVIDIA GeForce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a touch screen panel 1516 on or separate from display 1510. General purpose I/O interface also connects to a variety of peripherals 1518 including printers and scanners, such as an OfficeJet or DeskJet from Hewlett Packard.

A sound controller 1520 is also provided in the computing device such as Sound Blaster X-Fi Titanium from Creative, to interface with speakers/microphone 1522 thereby providing sounds and/or music.

The general-purpose storage controller 1524 connects the storage medium disk 1504 with communication bus 1526, which may be an ISA, EISA, VESA, PCI, or similar, for interconnecting all of the components of the computing device. A description of the general features and functionality of the display 1510, keyboard and/or mouse 1514, as well as the display controller 1508, storage controller 1524, network controller 1506, sound controller 1520, and general purpose I/O interface 1512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 16.

Figure 16:
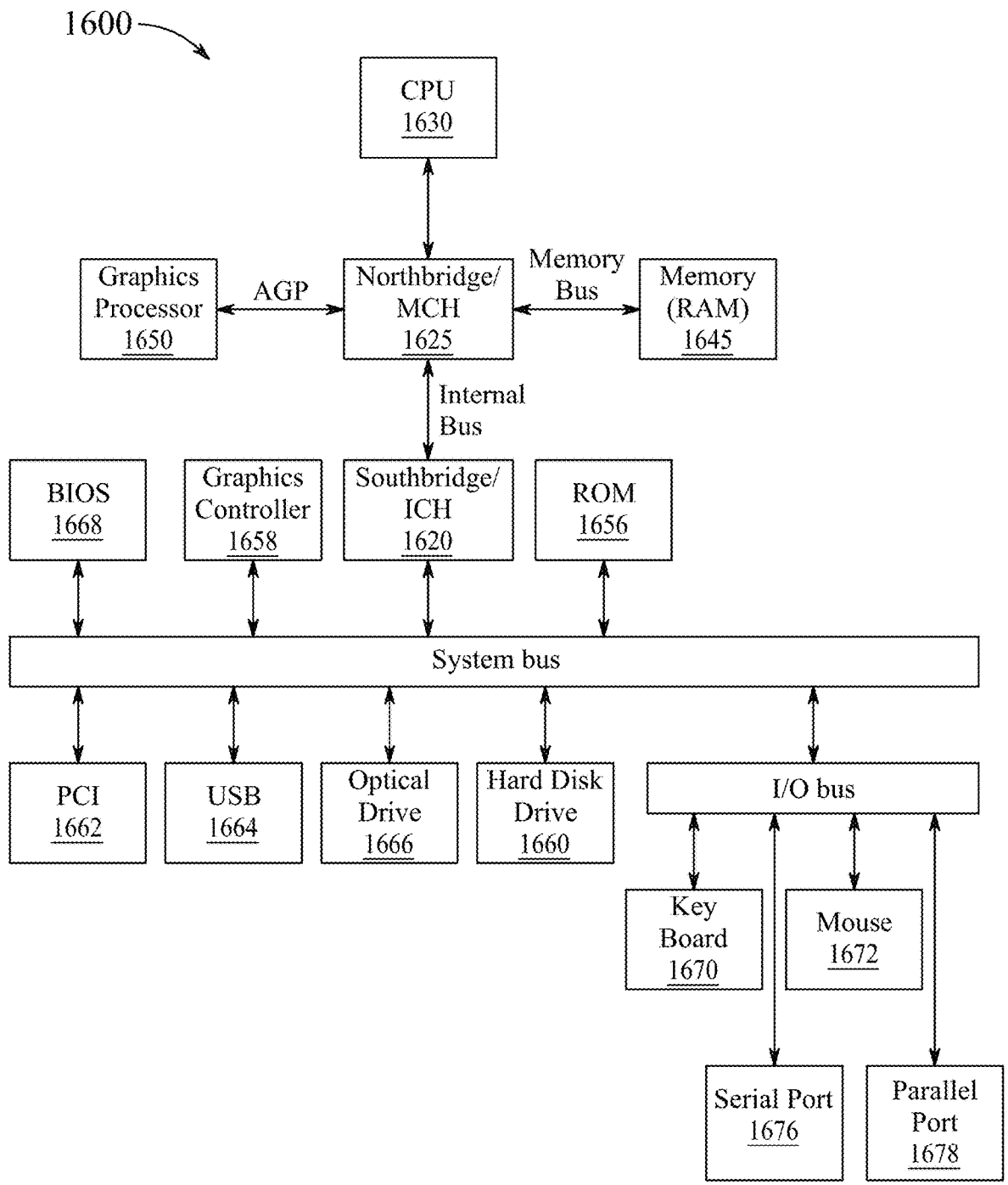
FIG. 16 is an exemplary schematic diagram of a data processing system used within the system, according to certain embodiments.

FIG. 16 shows a schematic diagram of a data processing system 1600 used within the computing system, according to exemplary aspects of the present disclosure. The data processing system 1600 is an example of a computer in which code or instructions implementing the processes of the illustrative aspects of the present disclosure may be located.

In FIG. 16, data processing system 1680 employs a hub architecture including a north bridge and memory controller hub (NB/MCH) 1625 and a south bridge and input/output (I/O) controller hub (SB/ICH) 1620. The central processing unit (CPU) 1630 is connected to NB/MCH 1625. The NB/MCH 1625 also connects to the memory 1645 via a memory bus, and connects to the graphics processor 1650 via an accelerated graphics port (AGP). The NB/MCH 1625 also connects to the SB/ICH 1620 via an internal bus (e.g., a unified media interface or a direct media interface). The CPU Processing unit 1630 may contain one or more processors and even may be implemented using one or more heterogeneous processor systems.

Figure 17:
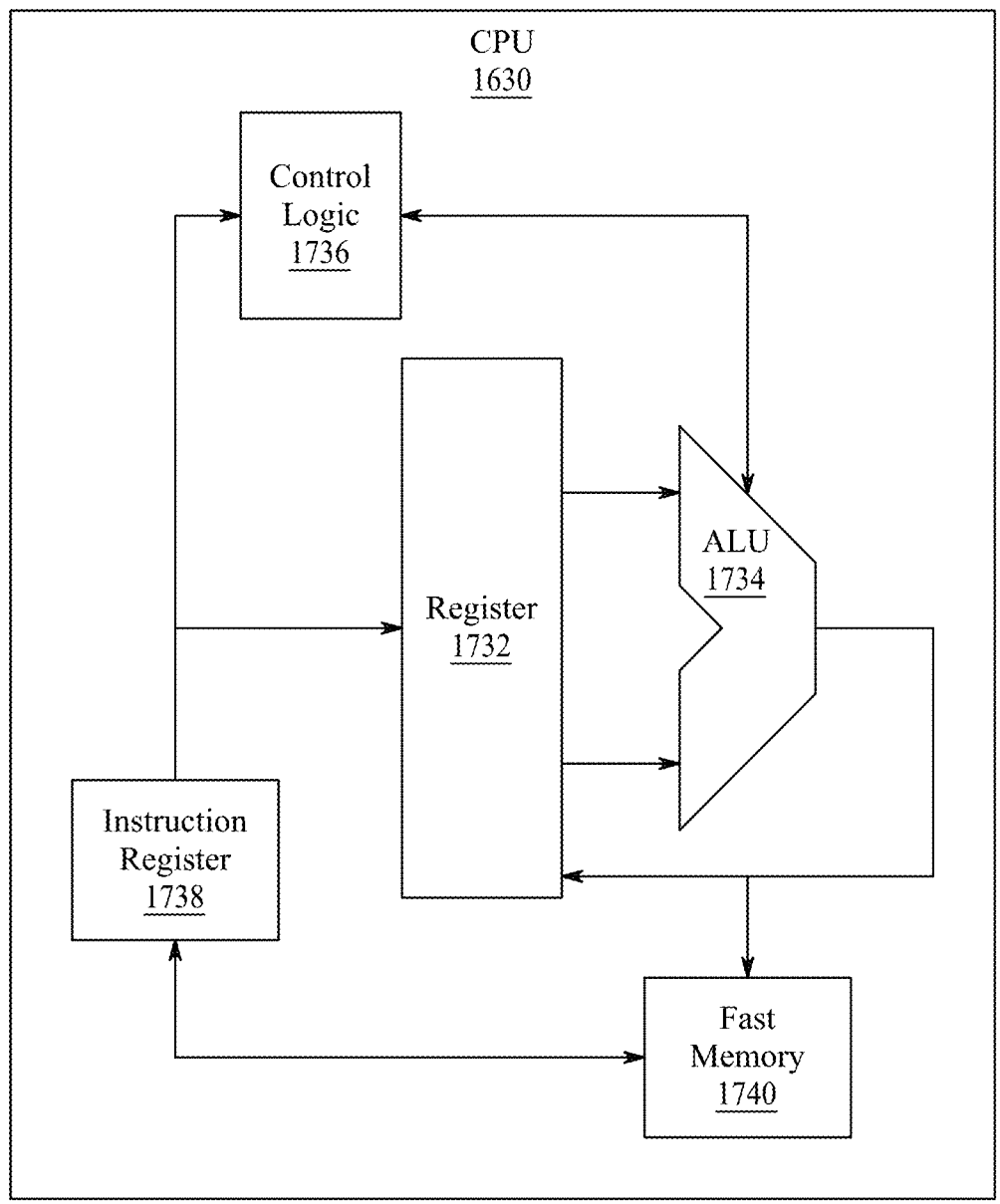
FIG. 17 is an exemplary schematic diagram of a processor used with the system, according to certain embodiments.

For example, FIG. 17 shows one aspects of the present disclosure of CPU 1630. In one aspects of the present disclosure, the instruction register 1738 retrieves instructions from the fast memory 1740. At least part of these instructions is fetched from the instruction register 1738 by the control logic 1736 and interpreted according to the instruction set architecture of the CPU 1630. Part of the instructions can also be directed to the register 1732. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1734 that loads values from the register 1732 and performs logical and mathematical operations on the loaded values according to the instructions. The results from these operations can be feedback into the register and/or stored in the fast memory 1740. According to certain aspects of the present disclosures, the instruction set architecture of the CPU 1630 can use a reduced instruction set architecture, a complex instruction set architecture, a vector processor architecture, a very large instruction word architecture. Furthermore, the CPU 1630 can be based on the Von Neuman model or the Harvard model. The CPU 1630 can be a digital signal processor, an FPGA, an ASIC, a PLA, a PLD, or a CPLD. Further, the CPU 1630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 16, the data processing system 1680 can include that the SB/ICH 1620 is coupled through a system bus to an I/O Bus, a read only memory (ROM) 1656, universal serial bus (USB) port 1664, a flash binary input/output system (BIOS) 1668, and a graphics controller 1658. PCI/PCIe devices can also be coupled to SB/ICH 1620 through a PCI bus 1662.

The PCI devices may include, for example, Ethernet adapters, add-in cards, and PC cards for notebook computers. The Hard disk drive 1660 and CD-ROM 1656 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1660 and optical drive 1666 can also be coupled to the SB/ICH 1620 through a system bus. In one aspects of the present disclosure, a keyboard 1670, a mouse 1672, a parallel port 1678, and a serial port 1676 can be connected to the system bus through the I/O bus. Other peripherals and devices that can be connected to the SB/ICH 1620 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 18:
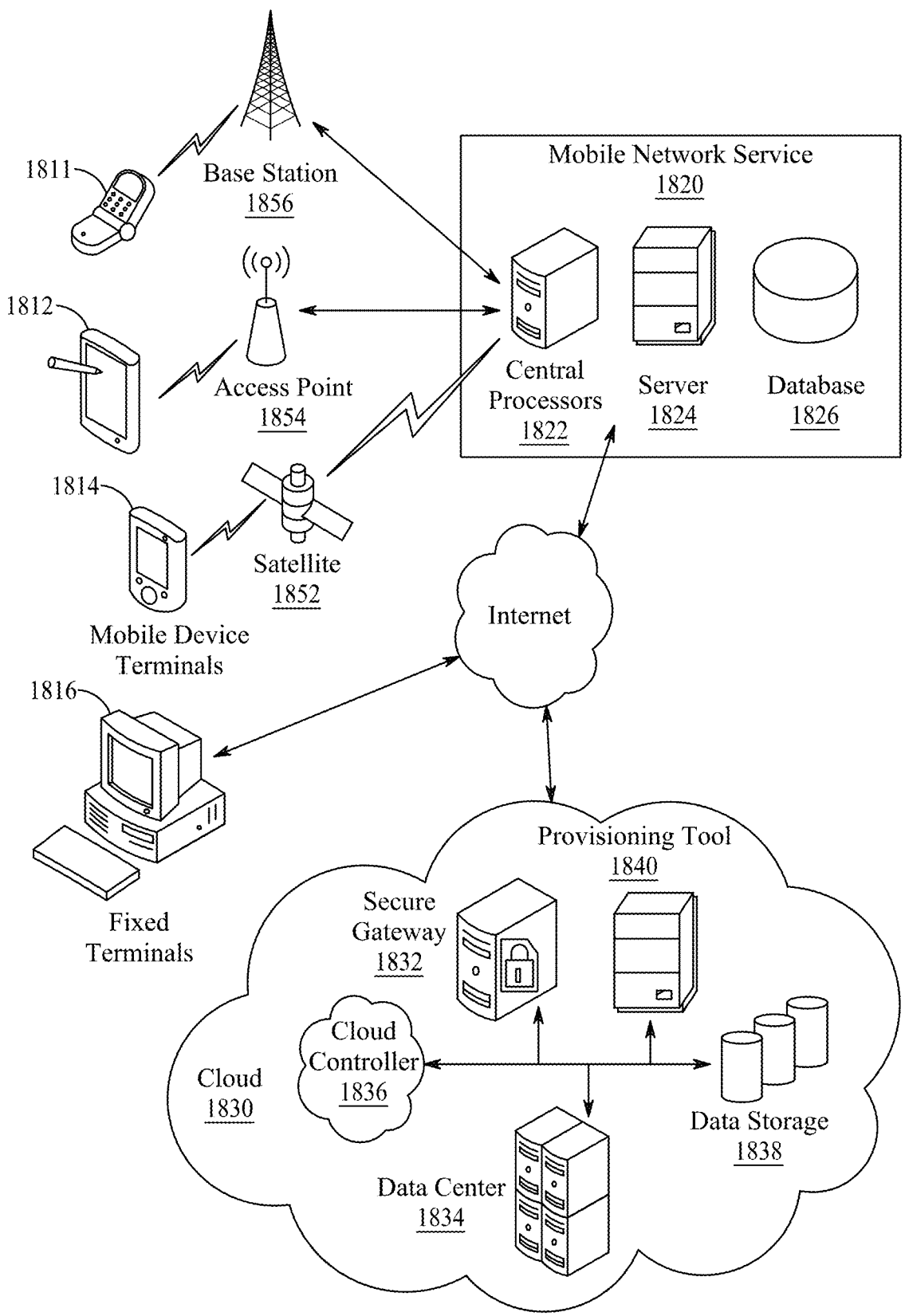
FIG. 18 is an illustration of a non-limiting example of distributed components which may share processing with a controller of the system, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 18, in addition to various human interface and communication devices (e.g., display monitors, smart phones, tablets, personal digital assistants (PDAs)). More specifically, FIG. 18 illustrates client devices including smart phone 1811, tablet 1812, mobile device terminal 1814 and fixed terminals 1816. These client devices may be commutatively coupled with a mobile network service 1820 via base station 1856, access point 1854, satellite 1852 or via an internet connection. Mobile network service 1820 may comprise central processors 1822, server 1824 and database 1826. Fixed terminals 1816 and mobile network service 1820 may be commutatively coupled via an internet connection to functions in cloud 1830 that may comprise security gateway 1832, data center 1834, cloud controller 1836, data storage 1838 and provisioning tool 1840. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for performing a seismic survey of a geological formation, comprising:
   generating, with a seismic transducer located at a surface of the geological formation, a seismic source wavelet within the geological formation;
   receiving, by an array of seismic sensors located at a surface of the geological formation, the seismic source wavelet convolved with seismic waves reflected from the geological formation including noise;
   generating, by the array of seismic sensors, seismic traces by transducing the seismic source wavelet convolved with the seismic waves reflected from the geological formation including the noise into electrical signals;
   transmitting, by each seismic sensor of the array of seismic sensors, the seismic traces;
   receiving, by a receiver, the seismic traces from each seismic sensor of the array of seismic sensors;
   generating, by the receiver, a set of seismic time-series traces;
   recording, in a memory of a computing device connected to the receiver, the set of seismic time-series traces;
   compressing, by the computing device, the set of seismic time series traces by quantizing a randomly selected subset of samples of the set of seismic time-series traces;
   deconvolving, by a trained long short-term memory (LSTM) neural network based autoencoder connected to the computing device, the randomly selected subset of samples;
   generating, by the trained LSTM neural network based autoencoder, a deconvolved randomly selected subset of samples; and
   reconstructing, by the computing device, the seismic waves reflected from the geological formation from the deconvolved randomly selected subset of samples.

2. The method of claim 1, further comprising:
   training the LSTM neural network based autoencoder on a field seismic data set.

3. The method of claim 1, further comprising:
   randomly selecting less than 20 samples of each seismic time-series trace.

4. The method of claim 1, further comprising:
   randomly selecting less than 30 samples of each seismic time-series trace.

5. The method of claim 1, wherein deconvolving, by the trained LSTM neural network based autoencoder, removes the seismic source wavelet and the noise from each seismic time-series trace of the randomly selected subset of samples.

6. The method of claim 1, wherein quantizing the randomly selected subset of samples further comprises:
   storing N binary bits of each sample of the randomly selected subset, wherein N is a whole number;
   determining a maximum value Y of each sample, wherein Y is a maximum absolute voltage value;
   selecting a scaling factor greater than zero and less than or equal to one; and
   determining a quantization interval q by multiplying the scaling factor by the maximum value Y.

7. The method of claim 6, further comprising selecting the scaling factor from one of the following:
   the scaling factor is 0.2 and the quantization interval q is 0.2Y;
   the scaling factor is 0.3 and the quantization interval q is 0.3Y;
   the scaling factor is 0.6 and the quantization interval q is 0.6Y; and
   the scaling factor is 0.8 and the quantization interval q is 0.8Y.

8. The method of claim 6, further comprising:
   calculating, by the computing device, a compression gain C, given by multiplying the N binary bits by a ratio of a base 2 log of q divided by a base 2 log of 2Y.

9. The method of claim 8, further comprising:
   upper bounding the compression gain by limiting an absolute value of a quantization error to be less than one half of the quantization interval q.

10. The method of claim 1, further comprising:
    comparing an amplitude of each reconstructed trace to a threshold value; and
    identifying spikiness when the magnitude exceeds the threshold value.

11. The method of claim 10, further comprising:
    displaying, on a computer screen of the computing device, the reconstructed seismic waves reflected from the geological formation;
    identifying spikiness within a reconstructed trace of the reconstructed seismic waves reflected from the geological formation;
    identifying at least one layer of the geological formation from the identified spikiness.

12. The method of claim 10, further comprising:
    displaying, on a computer screen of the computing device, the reconstructed seismic waves reflected from the geological formation;
    identifying spikiness within a reconstructed trace of the reconstructed seismic waves reflected from the geological formation; and
    identifying at least one fault in the geological formation from the identified spikiness.

13. A system for performing a seismic survey of a geological formation, comprising:
    a seismic transducer located at a surface of the geological formation, wherein the seismic transducer is configured to generate a seismic source wavelet within the geological formation;
    an array of seismic sensors located at a surface of the geological formation, wherein the array of seismic sensors is configured to generate seismic traces, wherein the seismic traces include the seismic source wavelet convolved with seismic waves reflected from the geological formation including noise;
    a transmitter operatively connected to each of the seismic sensors of the array of seismic sensors, wherein the transmitter is configured to wirelessly transmit the seismic traces;
    a receiver configured to receive the seismic traces and generate a set of seismic time-series traces;
    a computing device including electrical circuitry, a memory storing program instructions, and a processor configured to execute the program instructions;

a quantizer operatively connected to the processor, wherein the quantizer is configured to compress the set of seismic time series traces by randomly selecting a subset of samples of the set of seismic time-series traces;

a trained long short-term memory (LSTM) neural network based autoencoder operatively connected to the processor, wherein the trained LSTM neural network based autoencoder is configured to deconvolve the randomly selected subset of samples and generate a deconvolved randomly selected subset of samples; and a computer screen operatively connected to the computing device, wherein the computing device is configured to reconstruct the seismic waves reflected from the geological formation from the deconvolved randomly selected subset of samples and render the reconstructed seismic waves reflected from the geological formation on the computer screen.

14. The system of claim 13, further comprising:
a comparator configured to compare a magnitude of the reconstructed seismic waves reflected from the geological formation to a threshold value and identify spikiness in the magnitude when the magnitude is greater than or equal to the threshold value.

15. The system of claim 14, further comprising:
a database configured to store records which relate patterns of spikiness to structures in the geological formation;
wherein the computing device is configured to determine a pattern of the spikiness and compare the patten of spikiness to a record within the database to identify at least one structure of the geological formation.

16. The system of claim 15, wherein the computing device is further configured to identify the pattern as one of a fault, a layer, a changed composition of a layer, an oil layer, a sand layer and a rock layer.

17. The system of claim 13, wherein the computing device is configured to randomly select less than 20 samples of each seismic time-series trace.

18. The system of claim 13, wherein the quantizer is configured to:
store N binary bits of each sample of the randomly selected subset, wherein N is a whole number;
determine a maximum value Y of each sample, wherein Y is a maximum absolute voltage value;
select a scaling factor greater than zero and less than or equal to one; and
determine a quantization interval q by multiplying the scaling factor by the maximum value Y.

19. A method for performing a seismic survey of a volume of a below ground substrate, comprising:
selecting an array of seismic sensors for performing the seismic survey;
installing the array of seismic sensors on a ground surface above the volume of a below ground substrate in a pattern configured to detect reflected seismic waves from areas of interest within the volume;
generating, with a seismic transducer, a seismic source wavelet within the volume;
receiving, by an array of seismic sensors located at a surface of the geological formation, the seismic source wavelet convolved with seismic waves reflected from the geological formation including noise;
generating, by the array of seismic sensors, seismic traces by transducing the seismic source wavelet convolved with the seismic waves reflected from the geological formation including the noise into electrical signals;
transmitting, by each one of the array of seismic sensors, the seismic traces;
receiving, by a receiver, the seismic traces from each one of the array of seismic sensors;
generating, by the receiver, a set of seismic time-series traces;
recording, in a memory of a computing device connected to the receiver, the set of seismic time-series traces;
compressing, by the computing device, the set of seismic time series traces by quantizing a randomly selected subset of samples of the set of seismic time-series traces;
deconvolving, by a trained long short-term memory (LSTM) neural network based autoencoder connected to the computing device, the randomly selected subset of samples, wherein deconvolving comprises removing the seismic source wavelet and the noise from each seismic time-series trace of the randomly selected subset of samples;
generating, by the trained LSTM neural network based autoencoder, a deconvolved randomly selected subset of samples;
reconstructing, by the computing device, the reflected seismic traces from the deconvolved randomly selected subset of samples;
comparing, by the computing device, an amplitude of each reflected seismic trace to a threshold value and identifying spikiness when the magnitude exceeds the threshold value;
determining, by the computing device, a pattern of the spikiness;
comparing, by the computing device, the pattern of the spikiness to a database storing records which relate patterns of spikiness to structures in the volume; and
displaying, on a computer screen of the computing device, the reflected seismic traces with the identification of the structures in the volume.

20. The method of claim 19, further comprising:
randomly selecting less than 20 samples of each seismic time-series trace.

* * * * *